A. J. COON
MACHINE FOR AUTOMATICALLY WRAPPING, BINDING, AND TYING PACKAGES.
APPLICATION FILED OCT. 25, 1913.

1,132,165.

Patented Mar. 16, 1915.
18 SHEETS—SHEET 1.

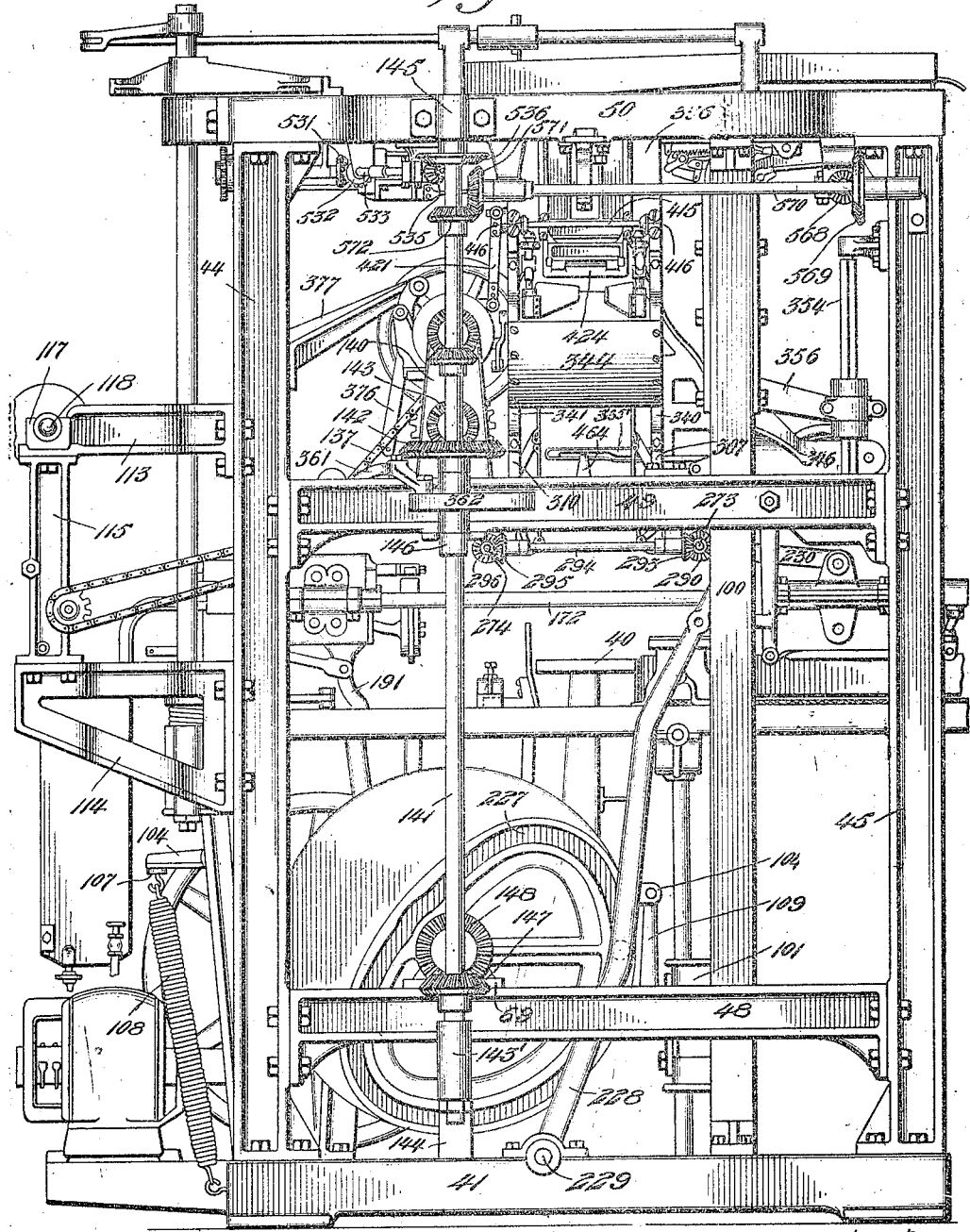

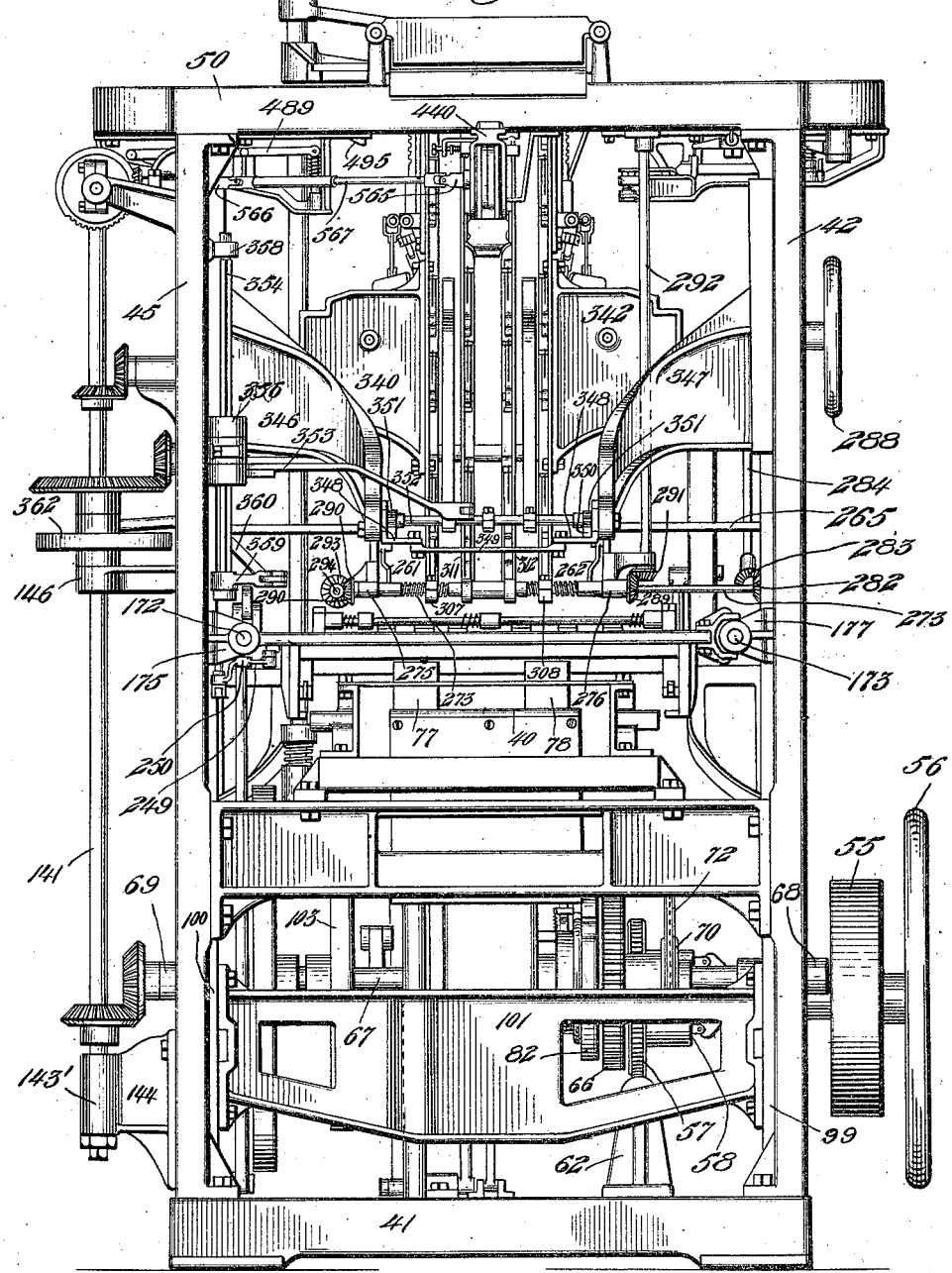

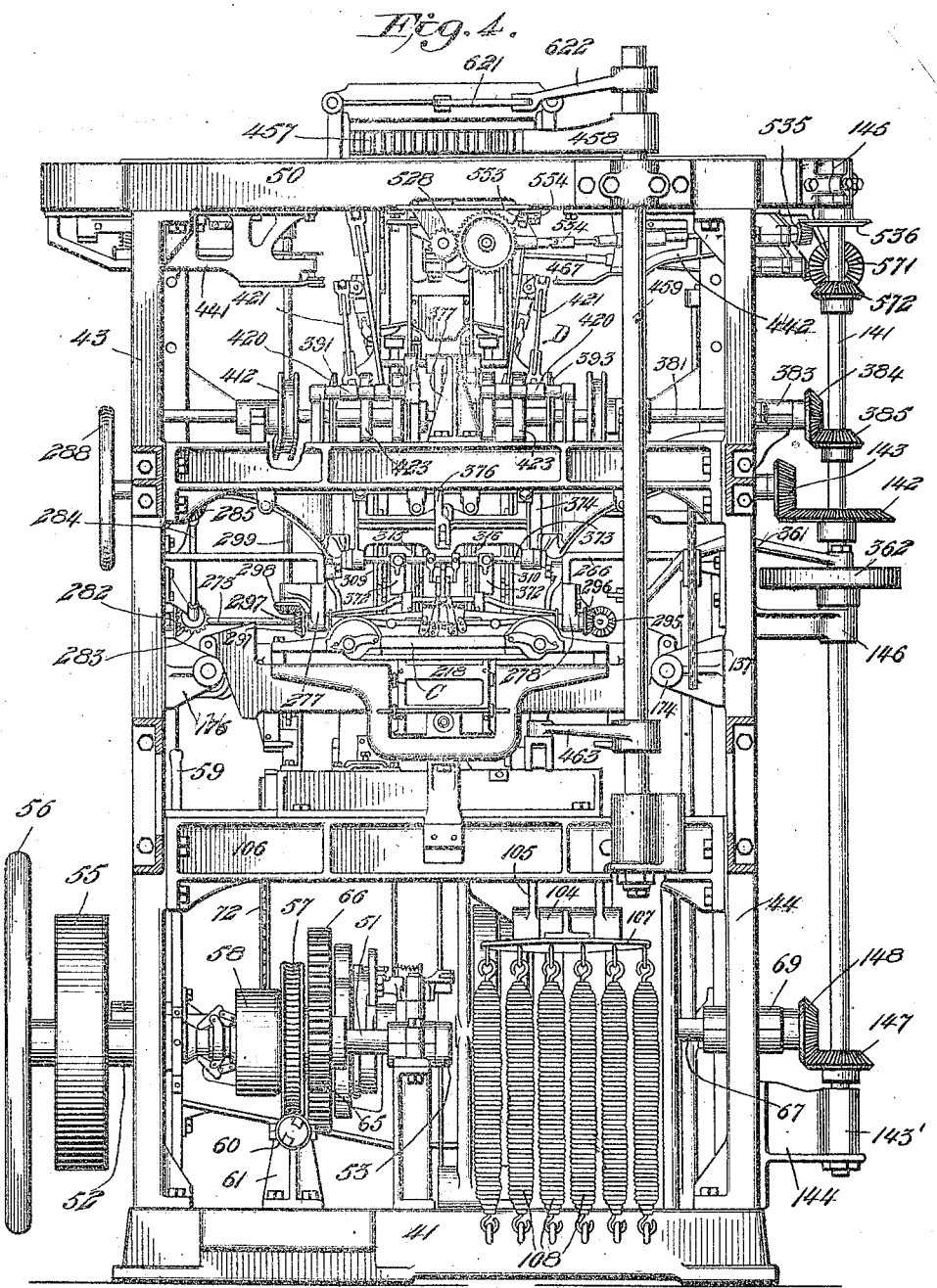

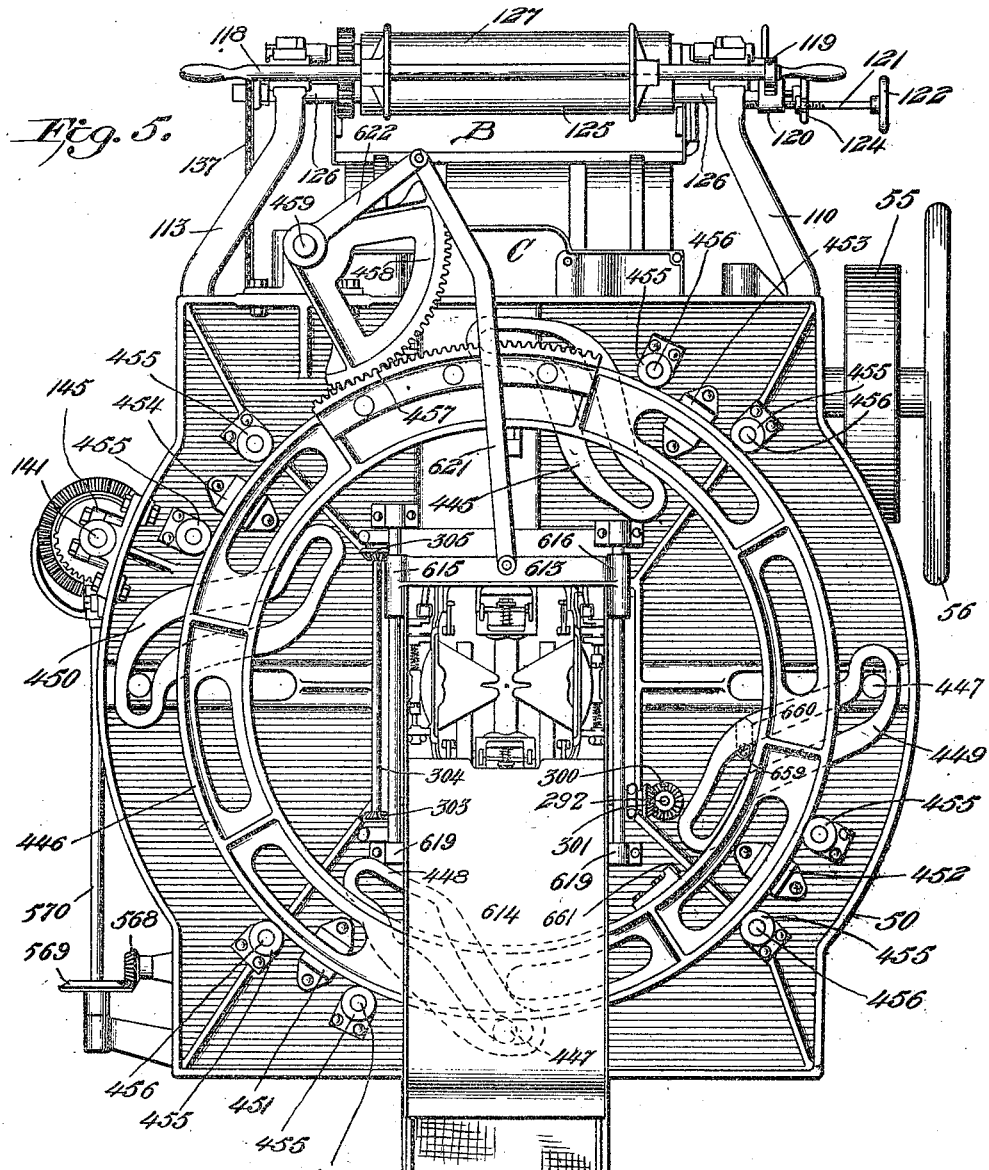

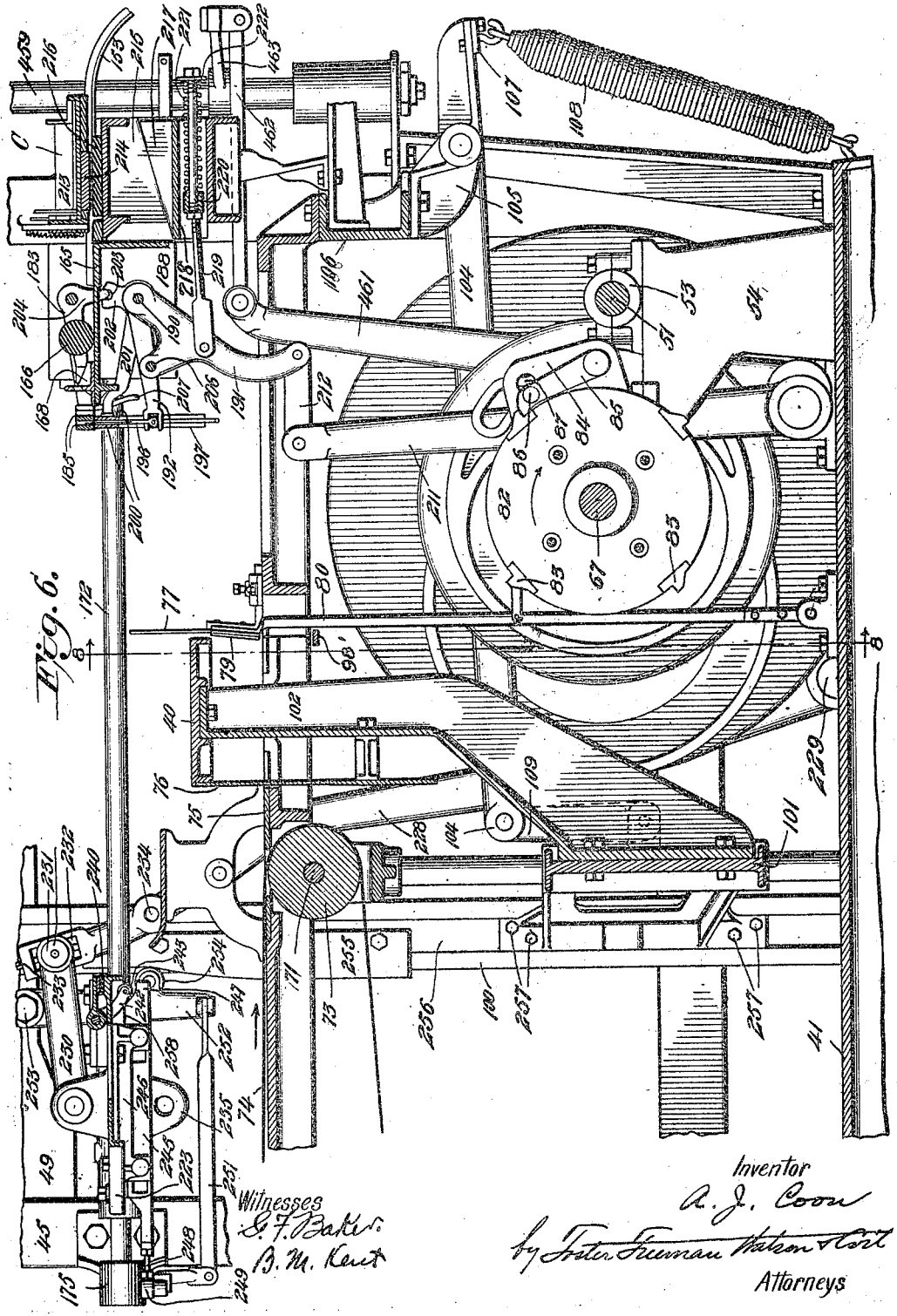

A. J. COON.
MACHINE FOR AUTOMATICALLY WRAPPING, BINDING, AND TYING PACKAGES.
APPLICATION FILED OCT. 25, 1913.
1,132,165.
Patented Mar. 16, 1915.
18 SHEETS—SHEET 7.
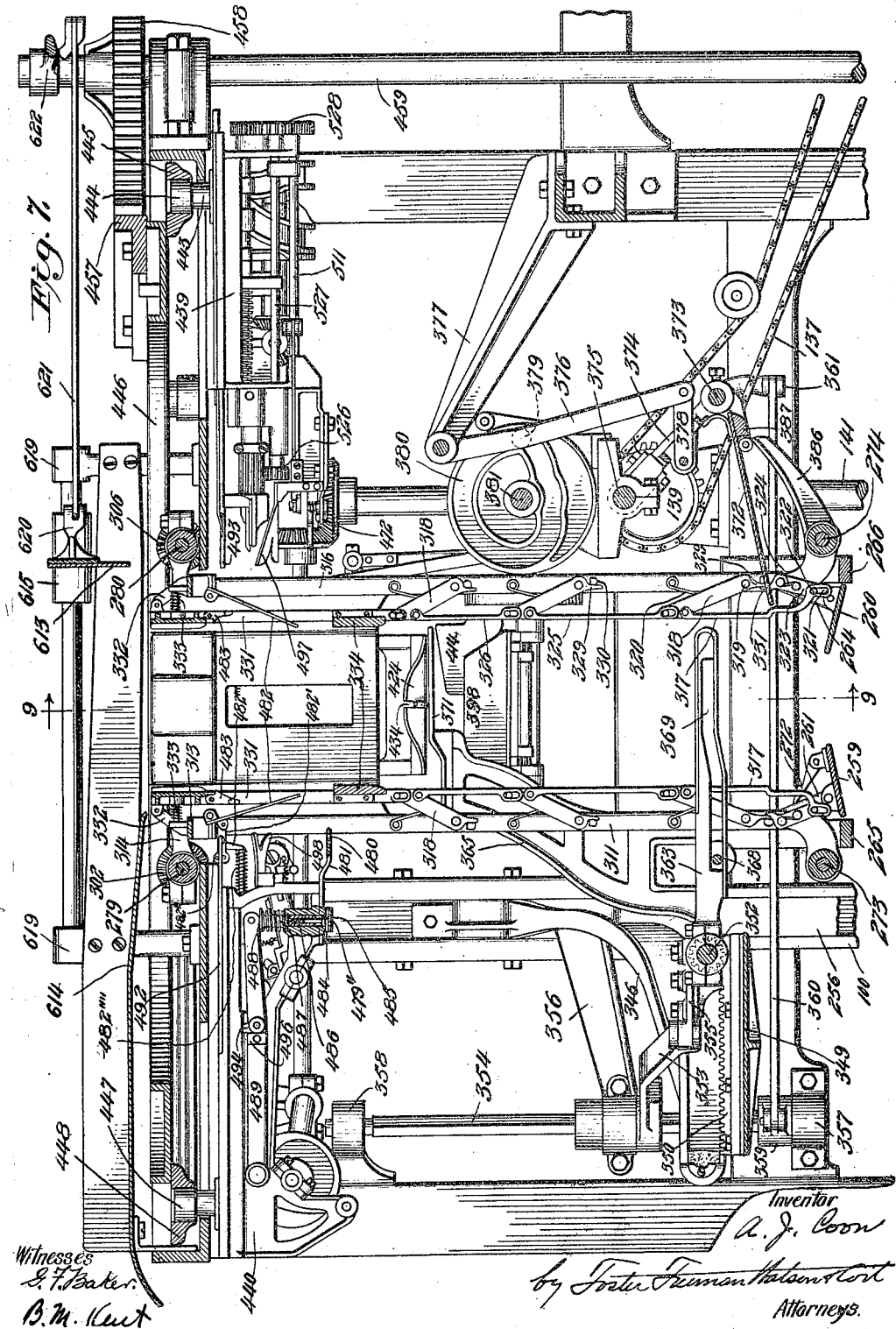

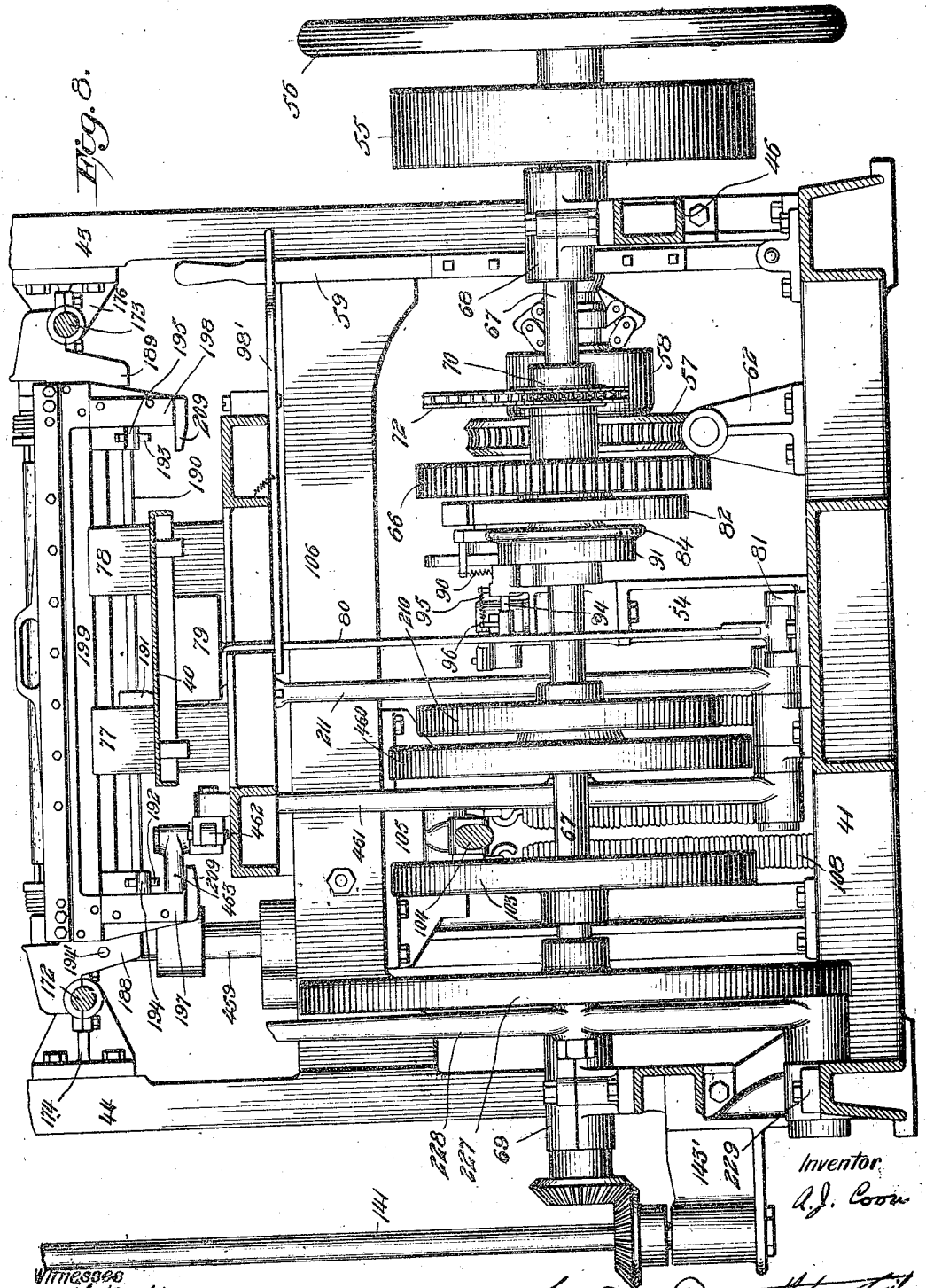

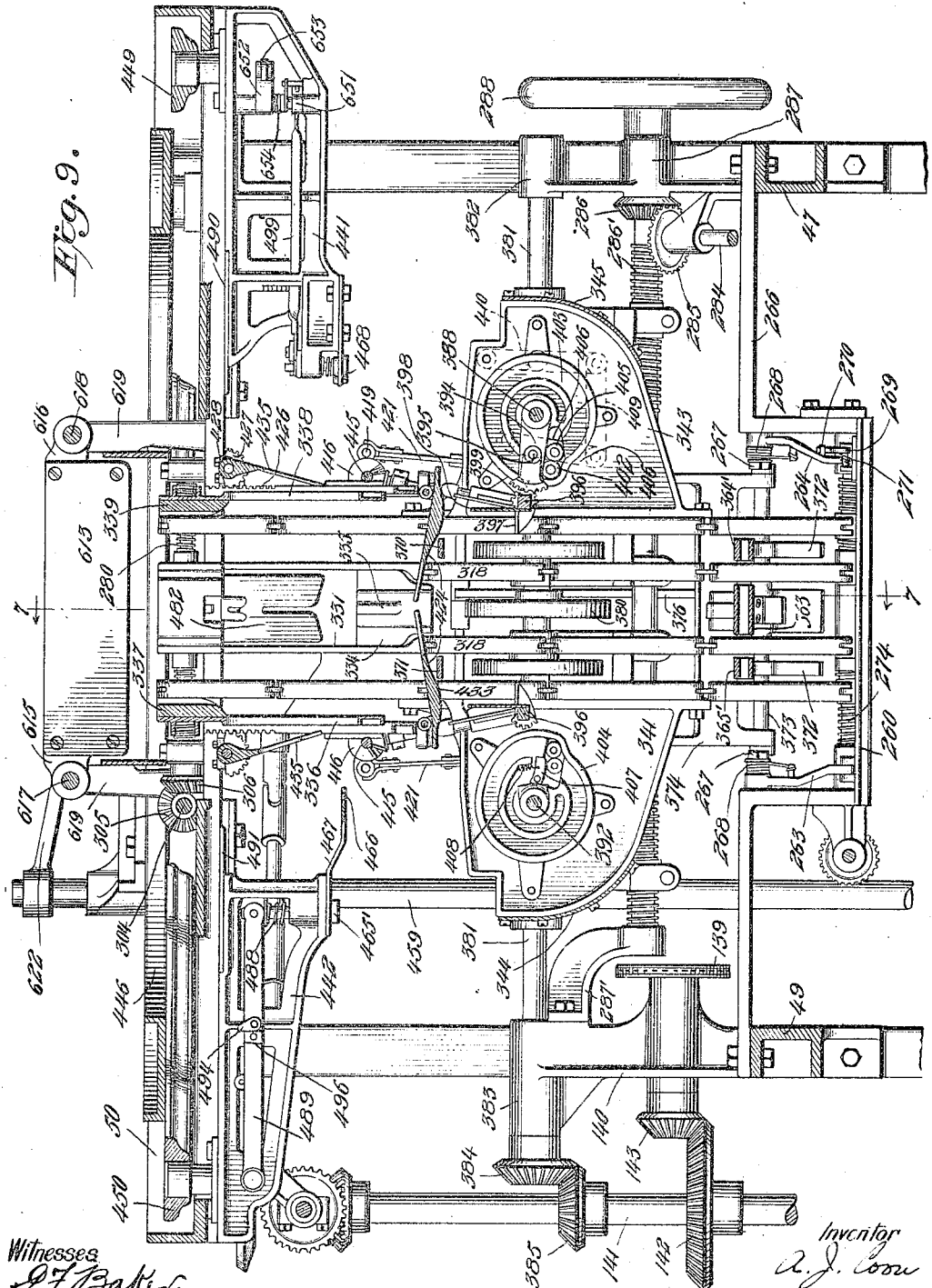

A. J. COON.
MACHINE FOR AUTOMATICALLY WRAPPING, BINDING, AND TYING PACKAGES.
APPLICATION FILED OCT. 25, 1913.
1,132,165.
Patented Mar. 16, 1915.
18 SHEETS—SHEET 10.
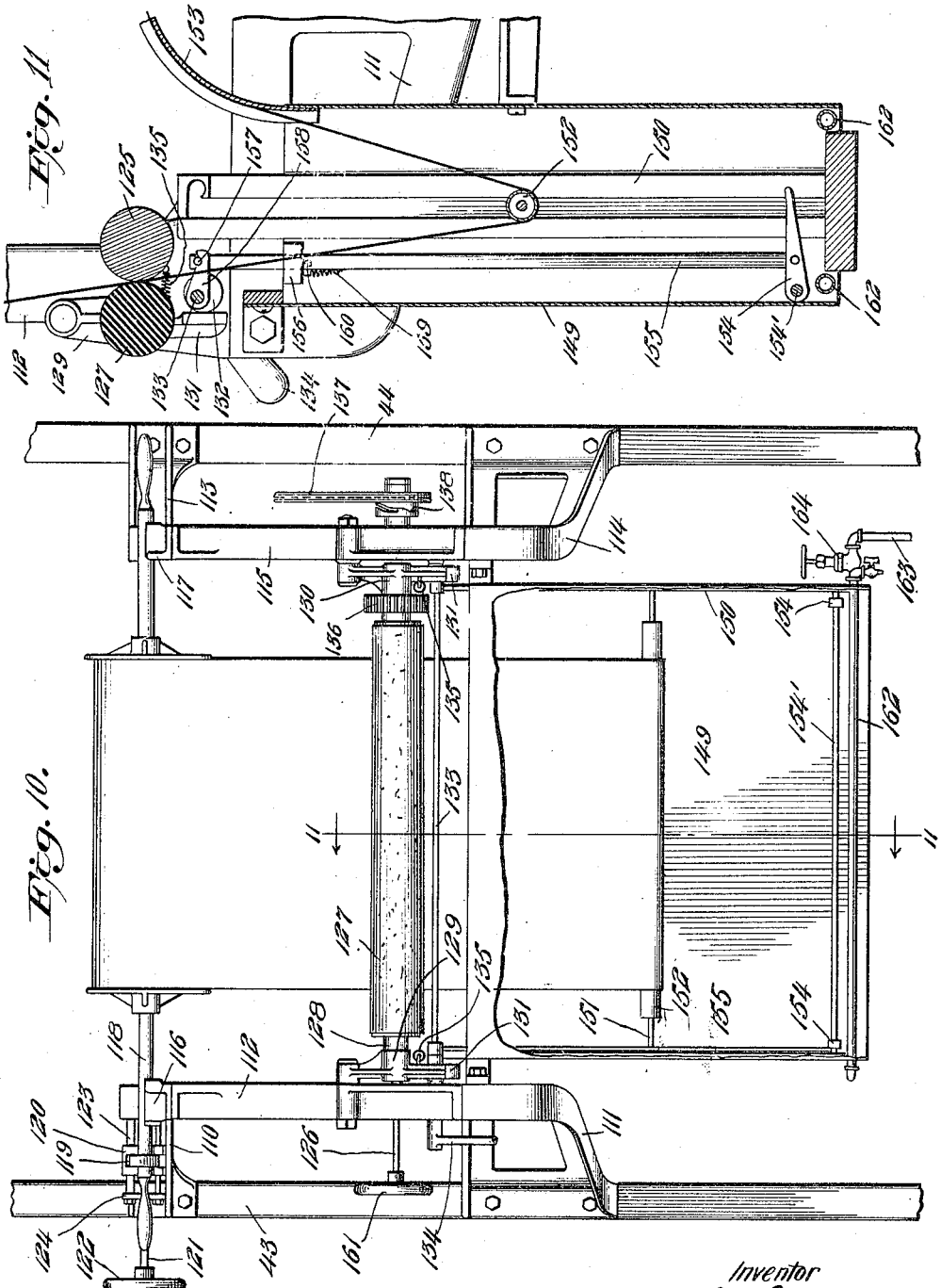

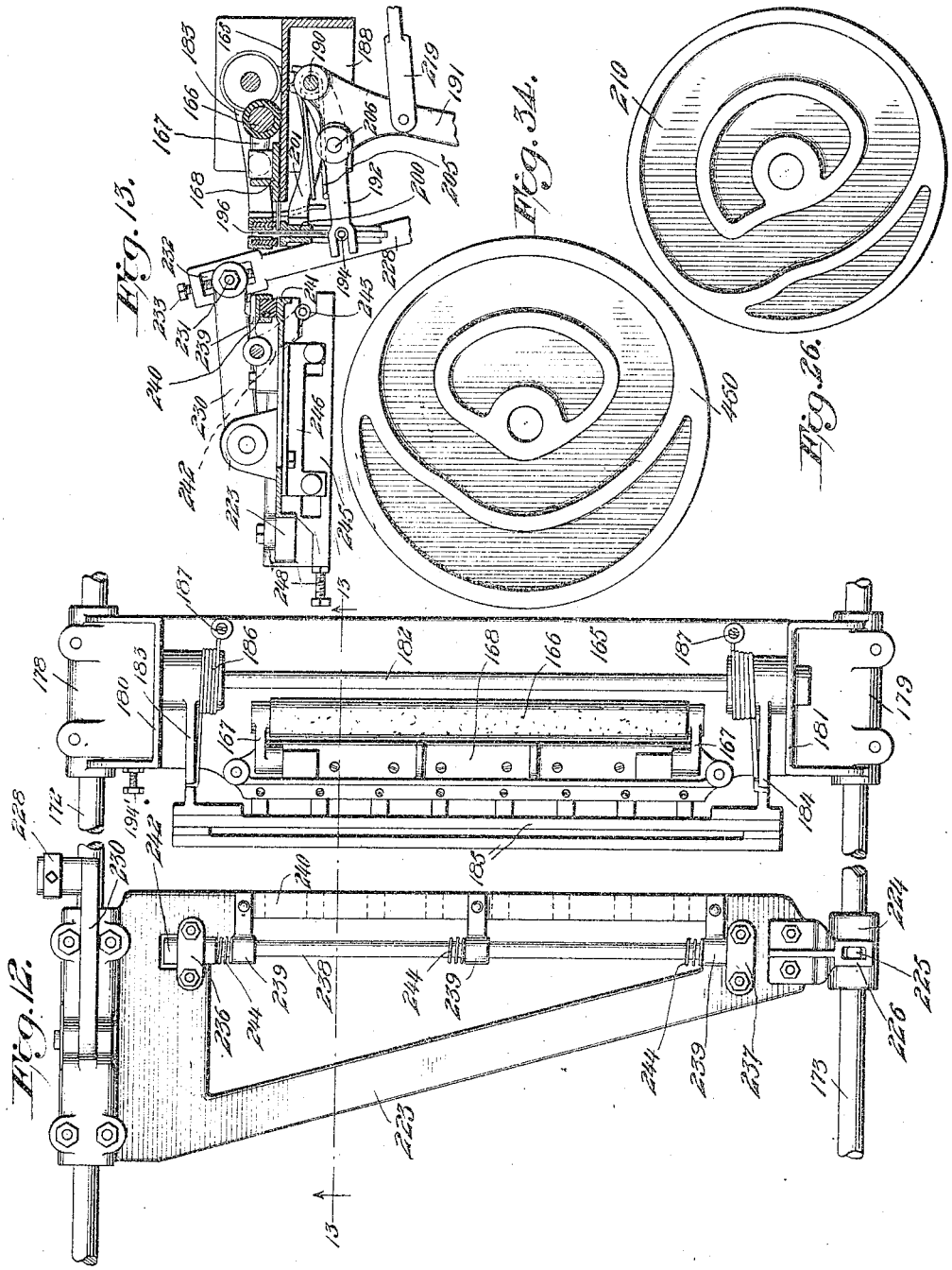

A. J. COON.
MACHINE FOR AUTOMATICALLY WRAPPING, BINDING, AND TYING PACKAGES.
APPLICATION FILED OCT. 25, 1913.
1,132,165.
Patented Mar. 16, 1915.
18 SHEETS—SHEET 12.
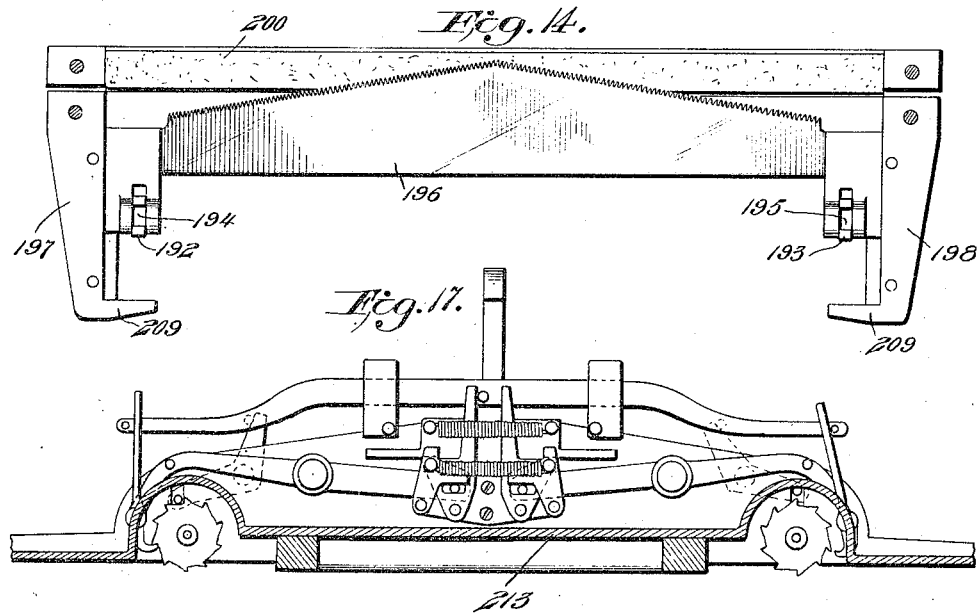
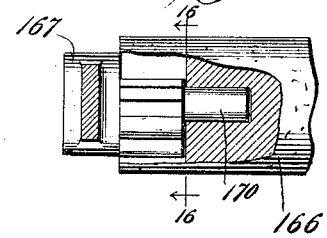
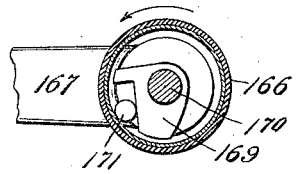

A. J. COON.
MACHINE FOR AUTOMATICALLY WRAPPING, BINDING, AND TYING PACKAGES.
APPLICATION FILED OCT. 25, 1913.
1,132,165.  Patented Mar. 16, 1915.
18 SHEETS—SHEET 13.
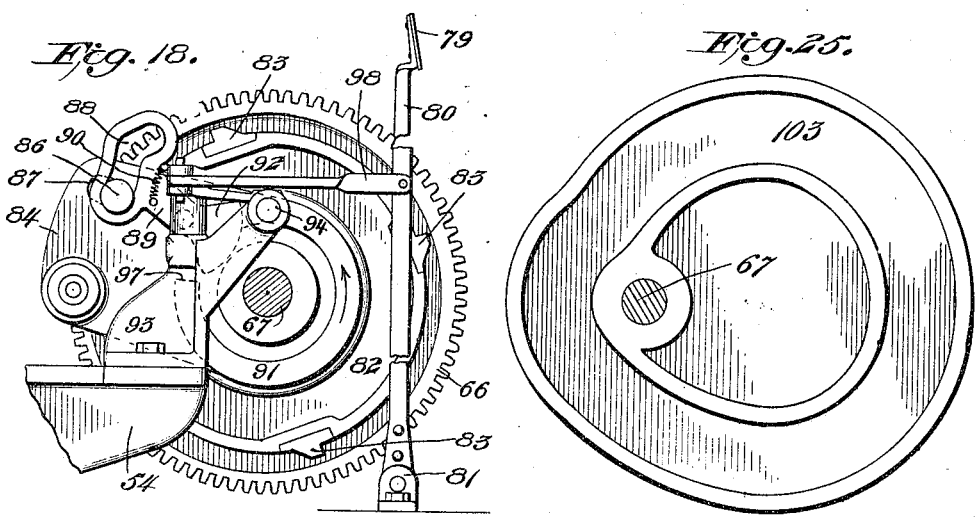
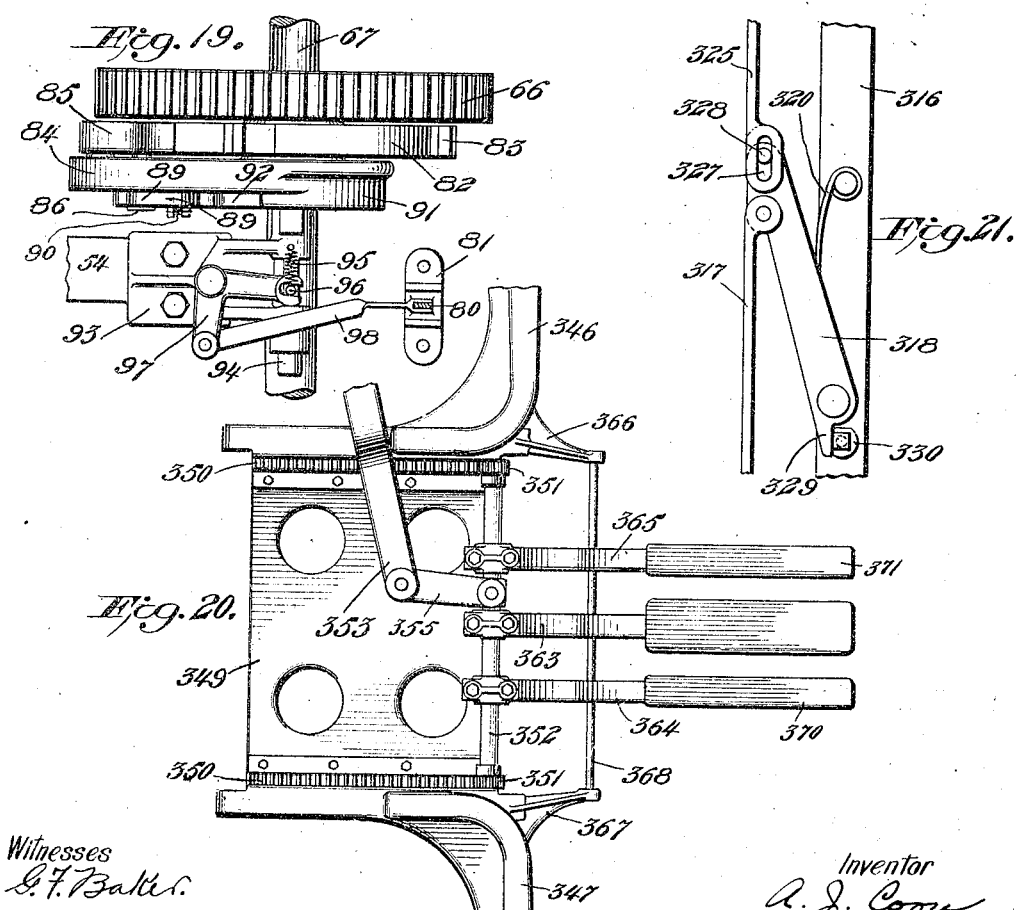
Witnesses
G. F. Baker
B. M. Kent
Inventor
A. J. Coon
by Foster Freeman Watson Hurt
Attorneys

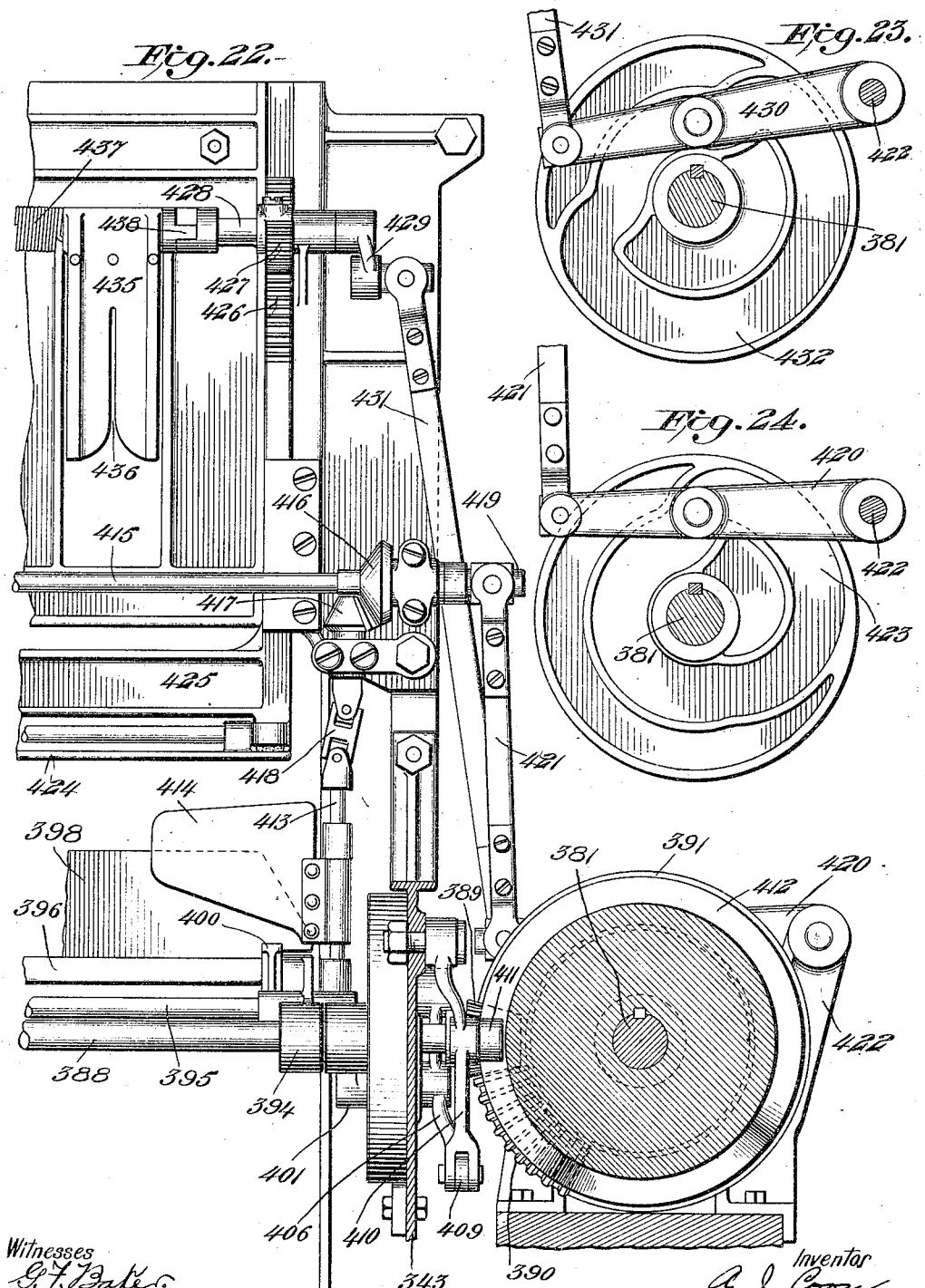

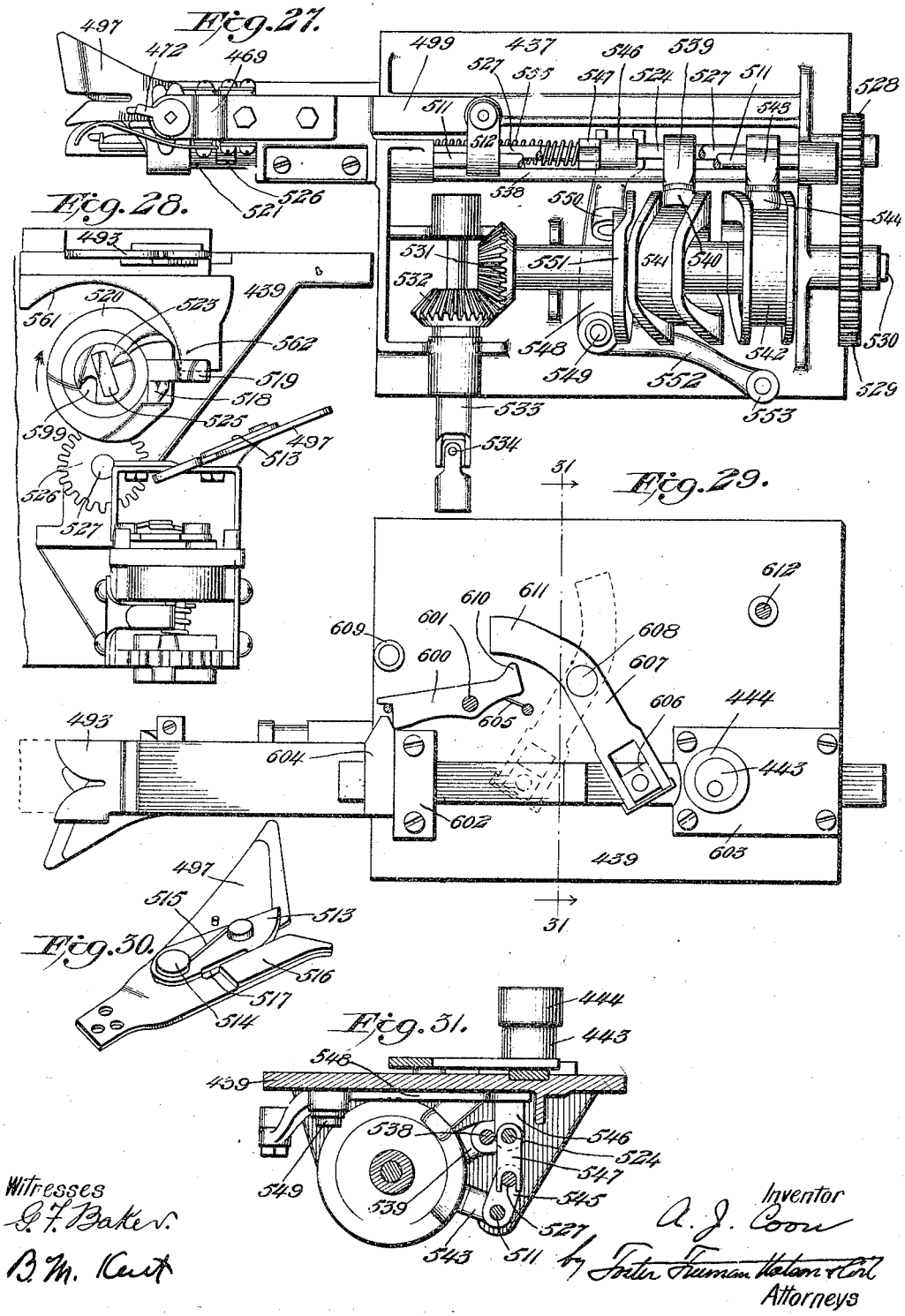

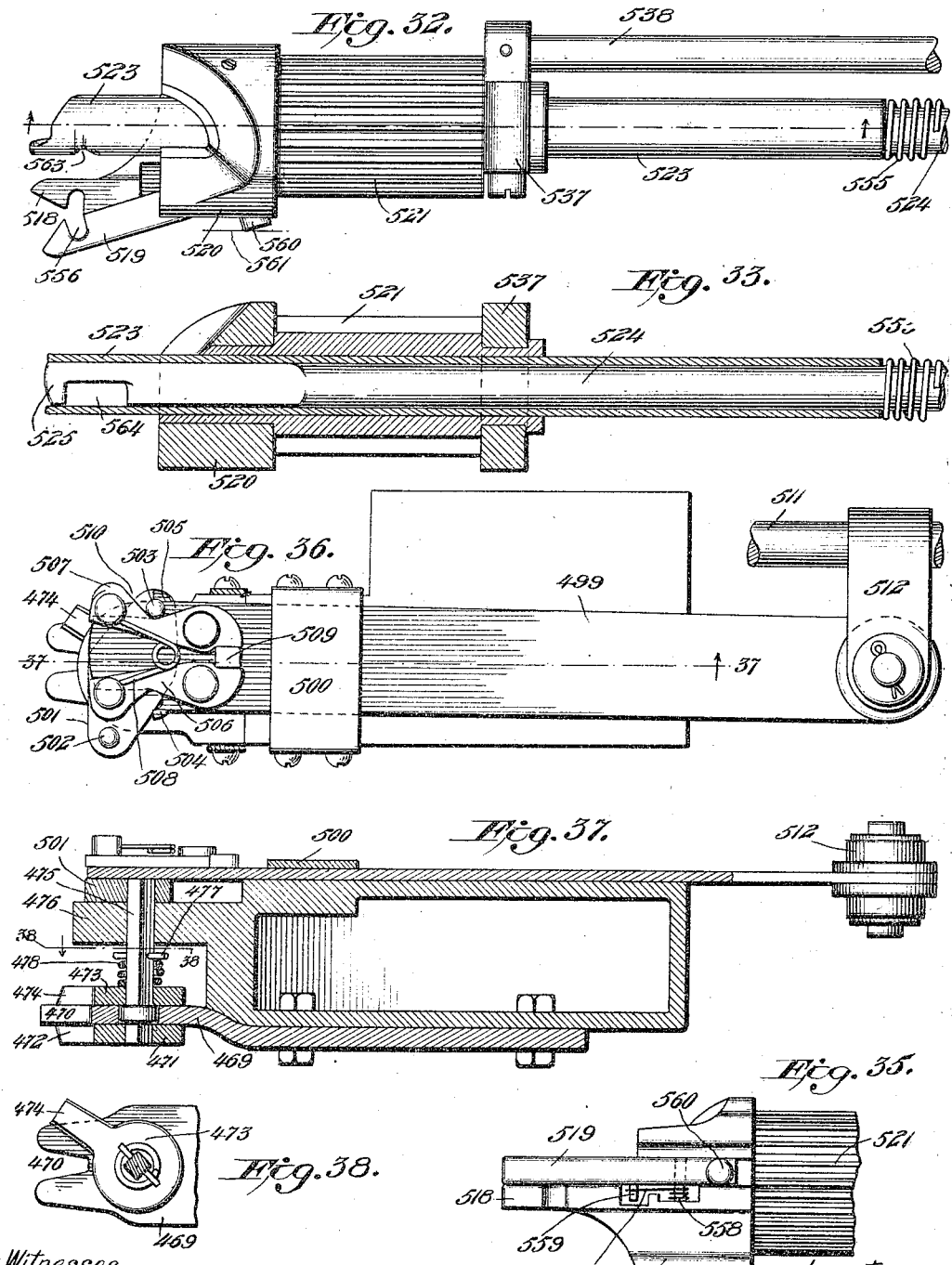

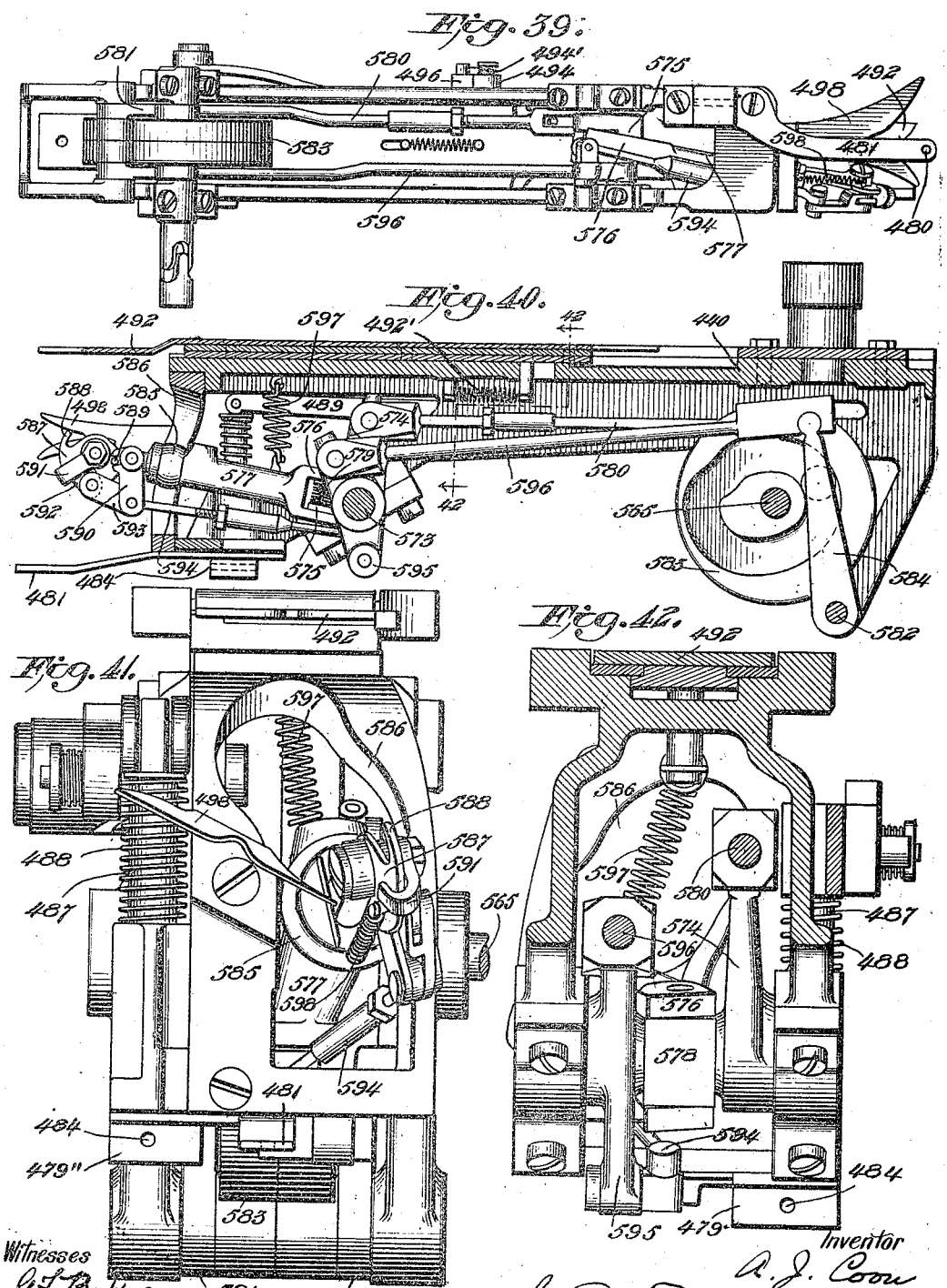

UNITED STATES PATENT OFFICE.

ARTHUR J. COON, OF PROVIDENCE, RHODE ISLAND, ASSIGNOR OF ONE-HALF TO FRANCIS M. WILLIS, OF ITHACA, NEW YORK.

MACHINE FOR AUTOMATICALLY WRAPPING, BINDING, AND TYING PACKAGES.

1,132,165.  Specification of Letters Patent.  Patented Mar. 16, 1915.

Application filed October 25, 1913. Serial No. 797,235.

*To all whom it may concern:*

Be it known that I, ARTHUR J. COON, a citizen of the United States, and resident of Providence, in the county of Providence and State of Rhode Island, have invented certain new and useful Improvements in Machines for Automatically Wrapping, Binding, and Tying Packages, of which the following is a specification.

This invention relates to wrapping machinery, whereby wrappers are applied to individual articles or groups of articles and the wrappers secured thereon by means of a suitable binder.

One of the objects of my invention is to provide a machine which is not only capable of folding the wrapper on an article or group of articles and applying a binder thereto, but also adapted to secure the binder thereon as by tying the ends thereof.

A further object of my invention is to provide a machine of this class which is adapted to cut the wrappers from a roll of material and apply appropriate printing thereto.

A further object of my invention is to provide a machine which is capable of being adjusted for the purpose of handling articles of different sizes.

My invention has been designed primarily for the purpose of wrapping loaves of bread, but it will be readily understood that it is not, in any way, limited to this use and that the various mechanisms comprising the machine may be adapted for use in combination with other mechanisms than those I have shown, for the purpose of accomplishing the same objects that I had in view, or for accomplishing other objects.

Figure 1:
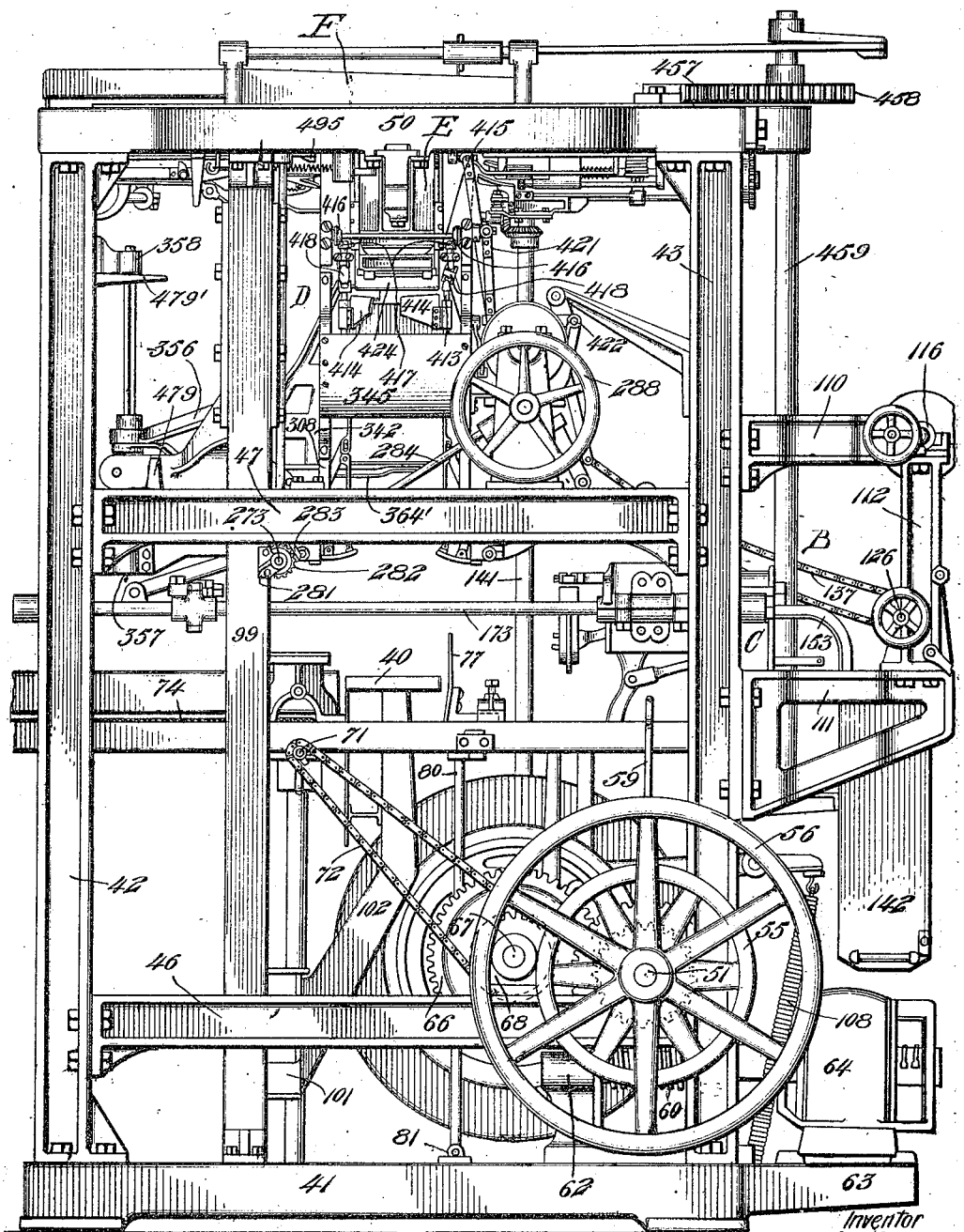
Figure 44:
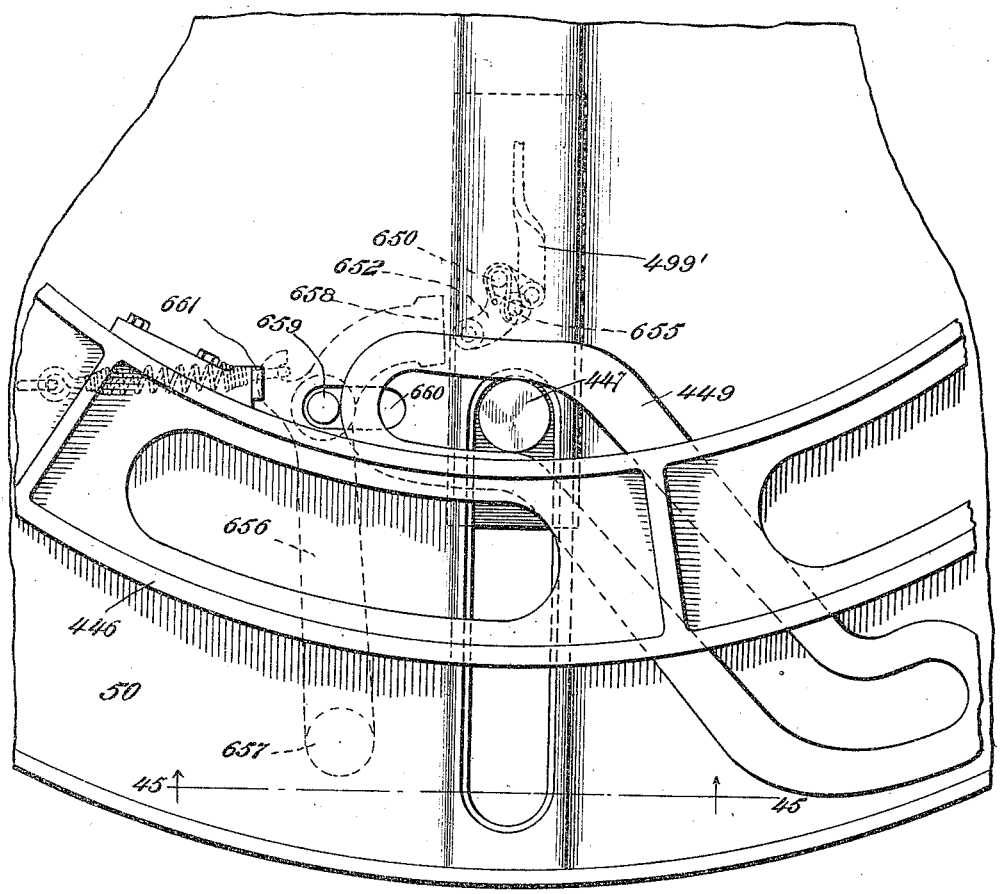
Figure 45:
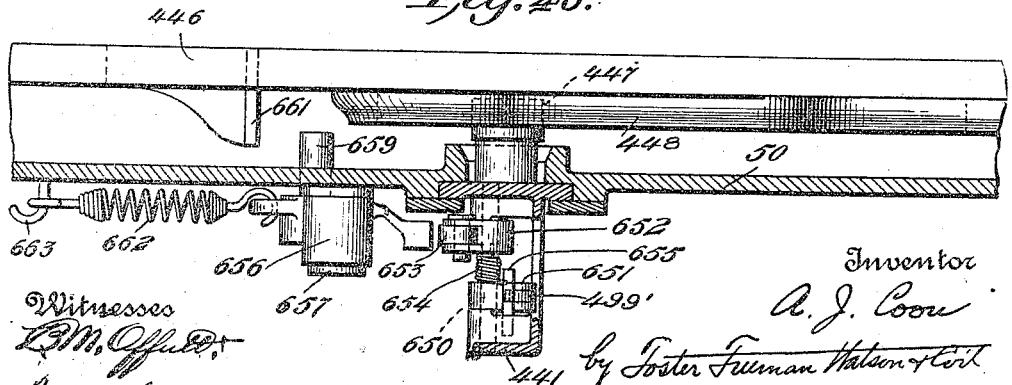

The novel features of the invention will be apparent from the following description, taken in connection with the accompanying drawings, in which, Figure 1 is a side elevation of a machine embodying my invention, the article-feeding mechanism being omitted; Fig. 2 is an elevation of the side opposite to that shown in Fig. 1; Fig. 3 is an elevation of the article-feeding and delivery end of the machine, with the feeding mechanism removed; Fig. 4 is an elevation of the end opposite to that shown in Fig. 3; Fig. 5 is a plan view of the machine including the feeding mechanism; Fig. 6 is a substantially central vertical section of the machine, on an enlarged scale, and showing the lower part thereof up to and including the paper handling mechanism; Fig. 7 is a view corresponding with Fig. 6 and showing the part of the machine above the paper handling mechanism; Fig. 8 is a vertical section substantially on the line 8—8 of Fig. 6 and on the same scale as Fig. 6; Fig. 9 is a view corresponding with Fig. 8 and showing the upper part of the machine; Fig. 10 is an end elevation of the paper feeding mechanism; Fig. 11 is an enlarged section on the line 11—11 of Fig. 10; Fig. 12 is a plan view of the wrapper cutting and carrying mechanism; Fig. 13 is a vertical section on the line 13—13 of Fig. 12; Fig. 14 is an enlarged detail of the paper cutter; Fig. 15 is a detail section of the paper gripping roll; Fig. 16 is a section on the line 16—16 of Fig. 15; Fig. 17 is a transverse vertical section through the printing mechanism; Fig. 18 is an elevation of the trip mechanism whereby the machine is thrown into and out of operation; Fig. 19 is a plan view of the same; Fig. 20 is a plan view of a portion of the wrapper folding and article elevating mechanism; Fig. 21 is a fragmentary detail elevation of the vertical guides for the article; Fig. 22 is an enlarged elevation of a portion of the wrapper folding mechanism; Figs. 23 and 24 are enlarged details of the cams which operate the mechanisms shown in Fig. 22; Fig. 25 is a side view of the cam for operating the elevating mechanism; Fig. 26 is a side view of the cam for operating the paper cutter; Fig. 27 is a bottom plan of the knotting mechanism; Fig. 28 is an elevation of the inner end of the knotting mechanism; Fig. 29 is a top plan of the knotting mechanism; Fig. 30 is a perspective view of a detail of the knotting mechanism; Fig. 31 is a section on the line 31—31 of Fig. 29; Fig. 32 is an enlarged elevation of a portion of the knotting mechanism; Fig. 33 is a central longitudinal section through Fig. 32; Fig. 34 is a side view of the cam for operating the knotting mechanism; Fig. 35 is a fragmentary elevation of the left hand portion of Fig. 32; Fig. 36 is a top plan of one of the binder handling mechanisms; Fig. 37 is a section on the line 36—36 of Fig. 35; Fig. 38 is a bottom plan of the binder cutter shown in Fig. 35; Fig. 39 is a bottom plan of the mechanism for drawing the loop against the article; Fig. 40 is a longitudinal section through Fig. 39; Fig. 41 is an enlarged elevation of the mechanism at the left hand end of Fig. 40; Fig. 42 is a transverse section on the line 42—42 of Fig. 40. Fig. 43 is a plan of details of the binding mechanism. Fig. 44 is a plan view of a portion of the top of the machine on an enlarged scale, and Fig. 45 is a section on the line 45—45 of Fig. 44.

The machine comprises generally the article feeding mechanism A, the wrapper feeding mechanism B, the printing mechanism C, the wrapper folding mechanism D, the binding and tying mechanism E and the delivery mechanism F.

Before proceeding to a detailed description of the various mechanisms of which the machine is composed, I will describe in a general way the manner of operation of the various parts of the machine, and for the purpose of clearly defining the various operations I will designate as the front of the article that face which is upward as the article enters the machine on the feeding mechanism A. The lower face, or the face which is opposite the front of the article, will be designated as the rear and the vertical faces which are transverse of the feeding mechanism will be designated as the sides of the article and the vertical faces which are longitudinal of the feeding mechanism will be designated as the ends of the article.

The feeding mechanism A comprises a conveyer which delivers the articles to an elevating member or platen 40, which transfers the articles from the feeding mechanism to the wrapping mechanism D. The wrapper feeding mechanism B is arranged to sever wrappers from a roll and transfer them to a position above the platen 40, so that they will be engaged by the article as it is elevated to the folding mechanism. Before the wrapper is severed it is printed by the mechanism C and as the article is moved into the folding mechanism it passes wipers which draw the wrapper downwardly around its sides. The article moves vertically through the folding mechanism which consists of various parts for forming the various folds at the ends of the article, these parts being arranged at intervals along the vertical path, which has flexible sides for guiding the article and also holding the same at the stopping points therealong. After the wrapper has been drawn down around the sides of the article, suitable mechanisms coöperate to fold the wrapper on the rear of the article and then to elevate the article to the mechanism which forms the end folds. After the end folds are made the article is moved into engagement with cords which are held across its path and when the article has passed the cord holding means, the latter are brought together at the center of the rear face of the article, the sections of the cord surrounding the article are severed from the supply sections, and the ends seized by a tying mechanism which forms the ends in a loop and slides the loop against the article and draws the same into a hard knot. After the cords or binders have been secured on the article, the latter is continued in its upward movement until engaged by the delivery mechanism. All of these parts coöperate to apply the wrapper to the article and secure the same thereon by means of suitable binders, the various mechanisms operating simultaneously on different articles so that after the operation of each mechanism another article is immediately brought into position to be operated upon.

*Article feeding mechanism.*—The frame of the machine consists of a base 41 which carries the four corner posts 42, 43, 44 and 45, the posts 42 and 43 being connected by cross members 46 and 47 and the posts 44 and 45 being connected by the cross members 48 and 49. Supported on these posts is a top casting 50. A driving shaft 51 is supported in bearings 52 and 53, the bearing 52 being arranged on the cross member 46 and the bearing 53 being on a bracket 54 secured to the base 41. The shaft 51 is preferably provided with a driving pulley 55 and a balance wheel 56, the latter also serving as a means whereby the machine may be turned over by hand. The shaft 51 has loosely arranged thereon a worm gear 57 which is adapted to be connected therewith by means of a friction clutch 58, this clutch being operated by means of a lever 59. In order to drive the shaft 51 by means of a motor a worm 60 is arranged in mesh with the gear 57 and is carried by a shaft which is supported in bearings 61 and 62. The base 41 has a rearward extension 63 adapted to support a motor 64 by means of which the worm 60 is driven. By this arrangement it is evident that the shaft 51 may be driven directly by means of the belt pulley 55, or by means of the motor 64, and when driven by the motor the machine may be started and stopped by means of the lever 59 without stopping the motor. The shaft 51 also has secured thereon a gear wheel 65 which meshes with a gear 66 loose on the shaft 67, the latter being supported in bearings 68 and 69. The shaft 67 also has loosely arranged thereon, but rigid with the gear 66, a sprocket wheel 70 which drives a shaft 71 by means of a chain 72. The shaft 71 carries a pulley 73 for a broad conveyer belt 74 by means of which the articles are conveyed into the machine. The belt 74 will, by this arrangement, always be in operation when the shaft 51 is operated.

The belt 74 delivers the articles onto a table 75 from which they move to the platen 40 when the latter is on a level with the table. The succeeding articles on the belt cause the articles to move from the table 75 onto the platen and an apron 76 on the front side of the platen prevents the articles from getting beneath the platen when the latter is in an elevated position. Arranged adjacent the rearward side of the platen are fixed uprights 77 and 78 which prevent the articles from overrunning the platen. Arranged between and slightly in advance of the uprights 77 and 78 is a plate 79 carried by an upright lever 80 which is pivotally mounted on a bracket 81 on the base 41. The plate 79, being slightly in advance of the uprights 77 and 78, will be engaged by the article first and moved rearwardly for a purpose to be described hereinafter.

The gear wheel 66 has arranged alongside thereof and rigidly secured thereto a wheel 82 provided with the projections or teeth 83, this wheel rotating with the gear.

Secured to the shaft 67 alongside the wheel 82 is an arm 84 which has pivoted thereto a dog 85. The dog 85 carries a pin 86 which projects through a slot 87 in the arm 84 and is arranged in the cam slot 88 in a lever 89 which is pivoted on the arm 84 (see Figs. 18 and 19). From Fig. 18 it will be evident that when the lever 89 is swung on its pivotal connection with the arm 84 the dog 85 will be rocked and the free end of the dog is so arranged that when the pin 86 is in the position shown in Fig. 18 it will be engaged by one of the teeth 83 on the wheel 82 and cause the arm 84 and the shaft 67 to rotate with the gear 66. For the purpose of swinging the lever 89 to the position shown in Fig. 18 there is provided a spring 90 which is connected with the lever and with a fixed pin on the arm 84. The arm 84 has arranged on the side thereof a circular cam 91 having a portion thereof cut away to receive the tail 92 of the lever 89. A bracket 93, suitably supported on the bracket 54, has slidably arranged therein a plunger or trip 94, the end of which is adapted to engage the side of the cam 91 as the arm 84 rotates. From Fig. 19 it will be observed that the face of the tail 92 is in line with the face of the cam 91 so that the trip 94 is adapted to slide from one to the other. A spring 95 has one end attached to an arm of the bracket 93 and the other end attached to a pin 96 on the trip and tends to draw the trip against the cam 91. Referring to Fig. 18 it will be seen that there is a space between the tail 92 and the end 97 of the cam 91 and as the arm 84 rotates the trip 94 will be drawn into this space by the spring 95, unless prevented, as described hereinafter. When the trip 94 moves into the space just referred to it will engage the edge of the tail 92 and since the trip is held stationary it will be obvious that further rotation of the arm 84 will cause the lever 89 to swing on its pivot, the cam slot 88 moving the dog 85 out of engagement with the tooth 83 and thus permitting the arm and the shaft 67 to stop.

Since all of the different mechanisms to be hereinafter described are driven from the shaft 67 the stopping of this shaft will cause all the mechanisms to be stopped and thus put the machine out of operation.

When the arm 84 is not rotating the trip 94 will be in engagement with the edge of the tail 92 and prevent the lever 89 from being swung to the position shown in Fig. 18 by the spring 90. Therefore if the trip 94 is withdrawn from engagement with the edge of the tail 92 the lever 89 will be swung to the position shown in Fig. 18 by means of the spring 90, thus throwing the dog 85 into the path of the teeth 83 so that, when one of these teeth engages the dog, the arm 84 and the shaft 67 will be caused to rotate with the wheel 82. When the lever 89 is swung by means of the spring 90, the face of the tail 92 will move across the end of the trip 94 and prevent the latter from returning to its former position and as the arm 84 rotates the end of the trip 94 will slide on the circular cam 91.

A bell crank 97 is pivotally mounted on the bracket 93 and has one arm in engagement with the pin 96 and the other arm pivotally connected with a link 98, this link being also connected with the lever 80, so that when the lever 80 is swung to the left, in Fig. 18, the trip 94 will be drawn out of the space between the end 97, of the cam 91, and the tail 92. The plate 79 at the upper end of the lever 80, being engaged by the article when the latter is received on the platen 40, it will be evident that the trip 94 will be actuated by the article to start the rotation of the shaft 67. While the arm 84 is making a rotation the platen is elevated and restored to its original position and another article is deposited thereon by the feeding belt so that when the end 97, of the cam 91, reaches the trip 94 the next succeeding article will be in engagement with the plate 79 and prevent the trip from being drawn into the space, beyond the end 97, by the spring 95 so that the end of the trip will pass over this space and into engagement with the face of the tail 92, and the arm 84 will not be stopped. It will therefore be apparent that the arm 84 and the shaft 67 will rotate continuously with the wheel 82 so long as articles are received on the platen and that as soon as the supply of articles is exhausted the trip 94 will effect the stopping of the shaft 67 in the manner above described. The lever 80 may also be actuated manually by means of a lever 98' pivoted to the table 75.

Secured to the base 41 and the top 50 on opposite sides of the machine are the vertical guides 99 and 100, in the lower ends of which a cross head 101 is adapted to slide.

A bracket 102, secured to the cross head 101, carries the platen 40 so that the latter will move up and down with the cross head. For the purpose of actuating the cross head I have provided on the shaft 67 a cam 103 (see Figs. 8 and 25). A lever 104, pivotally mounted on a bracket 105 on the cross member 106, which is supported by the corner posts 43 and 44 of the frame, carries a cam roller, which engages the cam 103, and has at its rearward end a cross beam 107 to which the upper ends of the counter balancing springs 108 are secured, the lower ends of these springs being attached to the base 41 (see Fig. 4). The opposite end of the lever 104 is pivotally connected with the upper end of a link 109, the lower end of which is pivotally connected with the cross head 101. The shape of the cam 103 is such (see Fig. 25) that the rotation of the shaft 67 effects the reciprocation of the cross head 101, the springs 108 counter balancing the cross head and the parts connected therewith and carried thereby.

*Wrapper feeding and printing mechanisms.*—Secured to the corner post 43 are the vertically spaced brackets 110 and 111 which are connected and braced at their outer ends by means of an upright member 112. The corner post 44 has similar brackets 113 and 114 which are connected and braced by an upright member 115. The brackets 110 and 113 carry bearings 116 and 117, respectively, for a shaft 118 having thereon a roll of paper from which the wrappers are cut. The shaft 118 has at one end thereof a collar 119 which is engaged by a yoke 120 on a screw 121, the screw being provided with a hand wheel 122 by means of which it may be rotated to move the yoke 120 axially thereof (see Figs. 5 and 10). The yoke 120 is guided and prevented from turning by means of the laterally projecting rods 123, the outer ends of which carry a plate 124, through which the screw 121 passes. This mechanism permits the shaft 118 to be adjusted in the axial direction for the purpose of alining the paper with the mechanism for feeding it to the machine. A feed roll 125 for the paper is arranged on a shaft 126 carried in suitable bearings in the uprights 112 and 115. A coöperating feed roll 127 is arranged on a shaft 128 carried by arms 129 and 130 which are pivotally supported on the uprights 112 and 115, respectively. The arms 129 and 130 are provided with downward extensions 131 which engage eccentrics 132 on a shaft 133, this shaft being adapted to be rotated by a handle 134 and being mounted in suitable bearings in the uprights 112 and 115. Springs 135 having one end fixed and the other end connected with the extensions 131 normally hold the roll 127 against the roll 125 and from Fig. 11 it will be evident that by turning the shaft 133 the eccentrics 132 will cause the roll 127 to be moved away from the roll 125.

The paper from the roll on the shaft 118 is led between the rolls 125 and 127, these rolls acting as feed rolls and being geared together by a pair of gears 136 and one of the rolls being driven by means of a chain 137, this chain passing over a sprocket 138, having a ratchet connection with the shaft 126, and over a sprocket 139 on a shaft which is supported in a bearing bracket 140 on the cross member 49 and driven from the vertical shaft 141 by means of bevel gears 142 and 143. The shaft 141 has its lower end supported in a bearing 143' carried by a bracket 144 on the base 41. The upper end of the shaft 141 is supported in a bearing 145 on the top 50. The shaft 141 is also supported at an intermediate point by means of a bearing 146 on the cross member 49. In order to drive the shaft 141 it is provided with a bevel gear 147 which meshes with a corresponding gear 148 on the end of the shaft 67.

The driving mechanism for the paper feed rolls 125 and 127 causes the paper to be fed from the roll on the shaft 118 at all times when the feed rolls are held together by means of the springs 135. In order to have the paper fed to the machine only as it is used and in order to avoid an accurate relation between the surface speed of the rolls 125 and 127 and the rate at which the wrappers are cut off from the supply strip, I have provided means for automatically separating the rolls 125 and 127 to stop the feed of the paper whenever a certain amount accumulates between the feed rolls and the cut off mechanism. Below the feed rolls I have provided a box 149 which is supported on the brackets 111 and 114 and provided at its sides with guides 150 for the shaft 151 of a dandy roll 152, this roll resting in the loop of paper below the feed rolls 125 and 127. As will be seen from Fig. 11, the paper passes from the feed rolls downwardly beneath the dandy roll 152 and then upwardly and out through the trough 153 to the cut off mechanism. The dandy roll holds the loop of paper fairly taut and the feed rolls, being operated at a speed slightly in excess of the requirements of the machine, will cause the length of the loop of paper in the box 149 to increase and permit the dandy roll to move down the guides 150.

The rolls 125 and 127, being adapted to be separated by the rocking shaft 133, I have provided means whereby this shaft is automatically rocked when the dandy roll approaches the bottom of the box 149. This means consists of levers 154 which are pivotally arranged on a shaft 154' on the interior of the box and have their free ends 155 arranged in a position to be engaged by the dandy roll. A rod 155 has its lower end pivoted to one of the levers 154 and its upper end arranged in a suitable guide 156. The rod 155 carries on its extreme upper end a pin 157 which engages a groove in the upper side of an arm 158 which is secured on the shaft 133. By reference to Fig. 11, it will be seen that when the dandy roll engages the levers 154 it will swing the latter downwardly and thus rock the shaft 133 so as to separate the feed rolls 125 and 127 and stop the feed of the paper. In order to hold the levers 154 normally in the position shown in Fig. 11, I have provided a spring 159 which is connected with the rod 155 and with the box 149 and tends to draw the rod upwardly, the upward motion being limited by means of a pin 160 which is adapted to engage the under side of the guide 156. The normal position of the hand lever 134 is such that this lever acts as a counterbalance to rock the shaft 135 to permit the rolls 125 and 27 to move into engagement. The shaft 126 may also be turned to feed the paper by means of a hand wheel 161, the ratchet sprocket 138 permitting the shaft to be rotated independent of the driving chain 13.

In order to moisten the paper when the latter is too dry, I have provided in the bottom of the box 149 a perforated steam coil 162 which is supplied by means of a pipe 163, the supply being controlled by a valve 164.

The paper is led from the trough 153 through the printing mechanism C to the cut off mechanism. Arranged forwardly of the printing mechanism is a table 165 which has in engagement with the top thereof a roll 166 carried by arms 167, these arms being pivoted to a guide plate 168 arranged above the table, the paper passing between this guide plate and the top of the table. (See Figs. 6, 12 and 13). The roll 166 is provided at one end with a ratchet device which permits it to rotate freely in the direction of movement of the paper, but holds it against movement in the opposite direction so that the dandy roll 152 will not draw the paper rearwardly after the wrapper has been cut off. This ratchet mechanism is shown in detail in Figs. 15 and 16 and comprises a cam member 169 which is secured on the pivot pin 170 and is held against rotation by the arm 167. A roller 171 is arranged between the shell of the roll 166 and the cam member 169 and so wedges itself when the roll rotates in the direction of the arrow in Fig. 16 that it prevents rotation of the roll. It is obvious however that the roller 171 will not interfere with the rotation of the roll 166 in the opposite direction.

Arranged on opposite sides of the machine are horizontal guide rods 172 and 173, the rod 172 being carried in brackets 174 and 175 on the corner posts 44 and 45, respectively. The rod 173 is supported in a similar manner by means of brackets 176 and 177 on the corner posts 43 and 42, respectively. The table 165 has its end portions 178 and 179 secured on the rods 172 and 173, respectively. This table is provided with upright walls 180 and 181 which have bearings for a shaft 182, this shaft having secured thereon the arms 183 and 184 which carry the spaced, parallel bars 185, these bars serving as clamps for the end of the paper strip and also as guides for the cutting knife. Springs 186 are coiled around the hubs of the arms 183 and 184 and have one of their ends secured to the table 165, as indicated at 187, their other ends being in engagement with the arms 183 and 184, as shown in Fig. 12. These springs are arranged to press the arms and the bars 185 downwardly for a purpose to be described hereinafter.

The table 165 is also provided with downwardly projecting walls 188 and 189 which support a shaft 190 to which a lever 191 and arms 192 and 193 are secured. The arms 192 and 193 have their ends connected with the pivots 194 and 195, respectively, on the cutting knife 196, the ends of this knife being arranged in guides 197 and 198 which are supported on a pair of bars 200. These bars are supported by bell crank levers 201 which are arranged alongside of the arms 192 and 193 and pivoted on the shaft 190 (see Figs. 6 and 13). The levers 201 have upwardly projecting arms 202 which are provided with recesses 203. The levers 183 and 184 have downwardly extending arms 204 which engage the recesses 203 so that the levers 201 and 183 and 184 will be rocked together. From the drawings it will be observed that the bars 185 and 200 coöperate to grip the paper between them and also, being spaced, guide the knife 196.

In order to open and close the bars 185 and 200 I have provided springs 205 which engage the arms 201 and 192 and 193 and are wrapped around the shaft 190. The tension of the springs 205 is such that the arms 201 are lifted thereby to bring the bars 185 and 199 together.

A rod 206 connects the lever 191 with the arms 192 and 193 for the purpose of relieving the shaft 190 of a certain amount of twisting stress to which it would be otherwise subjected by the lever 191.

From Figs. 6 and 13 it will be evident that by rocking the lever 191 the levers which carry the bars 185 and 200 are rocked and the knife 196 actuated. When the lever 191 is swung toward the left the first effect produced is to bring the bars 185 and 200 together on the paper. Further movement of the lever 191 swings the arms 192 and 193 upwardly to carry the knife 196 through the paper, the springs 205 yielding to permit the arms 192 and 193 to move while the arms 201 are held stationary by the engagement of the bars.

The arms 183 and 184 carry downward projections 207 which are engaged by the levers 192 and 193 just prior to the completion of the upward movement of these levers. The engagement of these extensions with the levers 192 and 193 provides a rigid connection between the levers and the levers 183 and 184 so that the latter will be carried upwardly with the levers 192 and 193, thus separating the bars 185 and 200 and releasing the paper. On the return stroke of the lever 191 the bars 185 and 200 move into engagement and the knife 196 moves downwardly in its guides until the arms 192 and 193 engage the abutments 209 on the guides 197 and 198. Further movement of the lever 191 causes the guides 197 and 198 to be drawn downwardly, together with the bars 200. The connections between the levers 183, 184 and 201 cause the bars 185 to be lifted when the bars 200 are lowered and the bars are thus caused to separate.

For the purpose of actuating the lever 191 in unison with the other parts of the machine I have provided on the shaft 67 a cam wheel 210 (see Figs. 8 and 26.) A lever 211, pivotally supported on the base 41, carries a cam roller which engages the cam 210, the cam causing the lever to be rocked as the shaft 67 rotates. The upper end of the lever 211 is connected with the lever 191 by means of a link 212.

Just prior to the passing of the paper through the cutting mechanism just described, it is printed. For this purpose I have provided, above the path of the paper, a supporting member 213 which carries the type, indicated at 214, and also carries the inking mechanism therefor. The inking is preferably done by means of a typewriter ribbon which is fed across the type by any suitable device, some of which are in common use on typewriters and are adapted to reverse the direction of motion of the ribbon when either end thereof is reached, the ribbon thus moving back and forth across the type as the impressions are made.

A vertically movable bed 215 carries a platen 216 which is adapted to press the paper and the ribbon against the type 214 and cause an impression to be made on the paper. For the purpose of moving the bed 215 I have provided on the lower side thereof inclined surfaces which engage wedges 217 on a horizontally movable frame 218. The frame 218 is moved by means of a rod 219, this rod being pivotally connected with the lever 191 and being adapted to slide through an abutment 220 on the frame 218. A spring 221 surrounds the rod 219 and is arranged between the abutment 220 and an abutment 222 on the rod so as to form a yieldable connection between the rod and the frame. By means of this yieldable connection the rod 219 will be permitted to move with the lever 191 when the frame 218 has moved to its uppermost position, the rod 219 sliding through the abutment 220 and the spring 221 being compressed by the continued movement of the lever 191.

In order to draw the wrapper to a position above the platen 40 I have provided the carrier 223 which has one end slidably arranged on the rod 172 and the other end supported by the sleeve 224 which slides on the rod 173. There is a universal joint connection between the carrier 223 and the sleeve 224 in order to permit relative movement of the parts, this connection consisting of a lug 225 on the sleeve which is arranged in the slotted bracket 226 on the carrier. The carrier is moved back and forth on the rods 172 and 173 by means of a cam 227 on the shaft 67. This cam actuates a lever 228 which is pivoted at 229 on the base 41 and has its upper end connected with the carrier by means of a link 230.

As shown in Fig. 13 the link 230 is connected with the lever 228 by means of a pivot pin 231 which is arranged in a slot 232 in the upper end of the lever and is adjustable longitudinally of the lever, for the purpose of varying the length of stroke of the carrier 223, by means of a screw 233. This connection between the link 230 and the lever 228 provides for a small variation in the length of the wrapper, since the length of the wrapper depends upon the stroke of the carrier 223. When a much shorter wrapper is desired, as for wrapping a smaller article, the link 230 is connected with the lever 228 at the opening 234 in the latter and with the lug 235 on the carrier. It will be obvious that with the link 230 in this position the stroke will be much shorter. If desired, other openings similar to the opening 234 may be provided in the lever 228 and the lug 235 may be extended for the purpose of giving additional variations in the length of the wrapper.

Mounted in bearings 236 and 237 on the carrier 223 is a shaft 238 which has secured thereto arms 239, these arms carrying a gripper bar 240 which coöperates with the surface of the carrier at 241 to form a clamp or gripper for the paper. From Fig. 13 it will be seen that the surface 241 is on the same level as the table 165. The shaft 238 also has secured thereto an arm 242 which carries at its lower end a cam roller 243. Springs 244 are arranged on the shaft 238 and tend to press the bar 240 against the surface of the carrier 223 to clamp the paper therebetween. In order to raise the bar 240 to release the wrapper there is arranged on the under side of the carrier 223 a cam member 245 which is engaged by the roller 243 and is slidably supported by means of a bracket 246 on the carrier. From Fig. 13 it will be evident that, when the cam member 245 is moved to the right, the arm 242 will be swung to lift the bar 240 and release the paper and, when the cam member is moved in the opposite direction the bar 240 will be permitted to move into engagement with the surface of the carrier 223, under the influence of the springs 244.

The cam member 245 is actuated to close the gripper bar 240 by the extension 247 striking an adjustable screw 194' (see Figs. 8 and 12), when the carrier is moved from the position shown in Fig. 6 to the extreme left hand position. It will be understood that the bars 185 and 200 will be separated at this time and, when the bar 240 engages the surface of the carrier 223 to grip the paper, the paper will be free so that when the carrier is moved to the right in Fig. 6 the paper will be carried with it to the extreme left hand position of the carrier. At the opposite end of the cam member 245 is arranged an adjustable screw 248 and this screw is engaged by a lever 249, having a fixed pivot 250, and actuated by a link 251 which is connected with a lever 252. The lever 252 is pivoted at 253 on the cross member 49 of the frame and carries a cam roller 254, which engages a cam 255 secured on the slide 256, the latter being secured to one end of the cross head 101 by means of bolts 257. The slide 256 moves up and down with the cross head 101 in the slideway 100. A slide similar to the slide 256 is secured to the opposite end of the cross head 101 and moves in the slideway 99.

After the carrier 223 reaches the position shown in Fig. 6 the lever 191 is actuated to bring the bars 185 and 200 together to grip the paper, and move the knife 196 to cut off the wrapper. After the wrapper is severed one of the bars 185 coöperates with one of the bars 200 to hold one end of the wrapper and, since the bar 240 has not been raised, the opposite end of the wrapper will be held by the carrier 223 so that the wrapper will be supported in a position above the platen 40.

After the wrapper has been severed from the strip of paper the cross head is raised by means of the lever 104, carrying with it the slides in the slideways 99 and 100 and also the platen 40. The article on the platen will engage the under side of the wrapper and at about this instant the lever 252 will be swung by the cam 255 and thus lift the gripper bar 240 to release one end of the wrapper. The opposite end of the wrapper is also released at about the same instant, in the manner hereinbefore described, and, both ends of the wrapper being released, it will be carried upwardly by the article.

The cam 255 swings the lever 252 sufficiently to move the cam member 245 to a position where the roller 243 engages the flat surface 258, which holds the gripper bar 240 in open position until it is closed again by engagement of the cam extension 247 with the screw 194'. The release of the wrapper by the gripper bar 240 may be varied with relation to the position of the platen 40 by adjusting the screw 248, since the amount which the screw projects from the cam member 245 determines the point at which it is engaged by the lever 249, and therefore the greater the extension of the screw 248 the earlier the release of the wrapper will be effected.

*Wrapper folding mechanism.*—As the article is moved upwardly by the platen 40 it is engaged by the wipers 259 and 260, arranged on opposite sides of the path of the article. These wipers consist of plates slightly longer than the article and pivotally supported on links arranged adjacent their ends, the wiper 259 being supported by the links 261 and 262 (see Fig. 3) and the wiper 260 being supported by links 263 and 264 (see Fig. 9). The cross bars 47 and 49 of the frame carry beams 265 and 266 (Figs. 7 and 9), these beams having downwardly offset portions at their centers and carrying pivot pins 267 for the arms 261, 262, 263 and 264. Springs 268 are arranged on the pins 267 and are connected with the arms for the purpose of pressing the arms toward the center of the path of the article. Before the wipers are engaged by the article they stand in the position shown in Fig. 7 and are held in this position by means of links 269 having one end pivoted to the wipers and the other end provided with a hook. As shown in Fig. 9 the link 269, which is attached to the wiper 260, has its end in engagement with a pin 270 on the arm 264 and in this manner the wiper is supported in the position shown. The links 269 are held against the pins by means of springs 271 (see Fig. 9). As shown in Fig. 7 the links 269 are also provided with an abutment 272 on their upper side which is adapted to engage the pins to loosely hold the wipers in a substantially vertical position, to which they are moved by the article.

Horizontal shafts 273 and 274 are provided adjacent the wipers 259 and 260, the shaft 273 being supported in bearings 275 and 276 carried by the cross beam 265. The shaft 274 is similarly supported in bearings 277 and 278 which are carried by the cross beam 266. Above the shaft 273 and supported in suitable bearings on the top 50 is a shaft 279 and above the shaft 274 and similarly supported in bearings on the top 50 is a shaft 280. The shaft 273 has an extension which is supported in a bearing 281 on the slideway 99 and carries a bevel gear 282 meshing with a gear 283 on a shaft 284 which is suitably supported and has secured on its upper end a bevel gear 285 (see Fig. 9). The gear 285 meshes with a gear 286 on a shaft 286' which is mounted in bearing brackets 287 and 287' and is adapted to be rotated by a hand wheel 288. The shaft 273 also carries gears 289 and 290, the former meshing with a gear 291 on a vertical shaft 292, and the latter meshing with a gear 293 on a horizontal shaft 294. The shaft 294 is supported in suitable bearings and also carries a bevel gear 295 which meshes with a gear 296 on shaft 274. The shaft 274 carries at its opposite end a bevel gear 297 which meshes with a gear 298 on a vertical shaft 299. The vertical shaft 292 carries at its upper end a bevel gear 300 which meshes with a gear 301 on shaft 279 and the shaft 279 has at its opposite end a bevel gear 302 which meshes with a gear 303 on a shaft 304 (see Figs. 5 and 7). The shaft 304 also carries a bevel gear 305 which meshes with a gear 306 on the shaft 280.

The system of shafts and gears just described is so arranged that the shafts 273, 274, 279 and 280, which are parallel, may be simultaneously rotated at the same speed by means of the hand wheel 288. The shafts 273 and 279 have threaded portions on opposite sides of the center of the vertical path of the article (see Fig. 3). These threaded portions carry the vertical bars 307 and 308 so that when the shafts are rotated these bars will move axially along the shafts. As indicated in Fig. 3, the portions of the shafts which receive the ends of the bars are threaded in opposite directions so that the bars will be caused to move to or from each other, depending upon the direction in which the shafts are rotated. The shafts 274 and 280 are similarly provided with threaded portions which receive the bars 309 and 310 (Fig. 4) and since all of the shafts are connected to rotate simultaneously it will be seen that the bars 307, 308, 309 and 310 may be moved simultaneously by rotating the hand wheel 288.

The shaft 273 has an unthreaded portion between the threaded portions thereof and vertical bars 311 and 312 are arranged thereon but are prevented from moving axially of the shaft when the latter is rotated. The bars 311 and 312 are connected together at their upper ends by a cross bar 313 and are supported on the shaft 279 by means of an arm 314. In a similar manner the shaft 274 has arranged on an unthreaded portion thereof the vertical bars 315 and 316, these bars being connected at their upper ends and supported by the shaft 280. The bars 311, 312 and 315 and 316 are not moved in any way by the rotation of the hand wheel 288. The articles are guided through the folding mechanism by means of links arranged on opposite sides of the path of the article.

Referring to Figs. 7 and 9 it will be observed that immediately above the wipers 259 and 260 and on opposite sides of the path of the article are arranged links 317, the upper ends of which are pivoted to arms 318, these arms being pivotally mounted on the bars just described. As shown in Fig. 7 the arm 318 on the right is pivoted at 319 to the bar 316 and is pressed against the article by means of a spring 320 carried by the bar. The lower end of the link 317 is provided with a slot 321 for a pin 322 which guides the lower end of the link and is carried by an arm 323, the lower end of the link 317 being held against the article by the spring 324. In Fig. 21 there is shown an enlarged detail of the means for supporting the upper end of the link 317. Above the link 317 are links 325 and 326 which have their upper ends carried by arms similar to the arms 318 and have their lower ends slotted as indicated at 327 to receive the pin 328 which is also carried by the arms 318. It is believed that this description will be readily understood and it will be seen that the springs 320 will yield to permit the guide links to separate for the purpose of allowing the article to pass therebetween. By constructing the guides in the form of connected links which are independently pressed against the article by springs, it will be seen that the article will be engaged by the guides throughout its length and any irregularities in the article will be taken up by the links.

For the purpose of limiting the movement of the arms 318 under the influence of the springs 320 I have provided extensions 329 on the lower ends of the arms, which are adapted to engage stops 330 carried by the bars which support the arms. As shown in Fig. 7, the arm 323 has an upward extension 331 which engages the extension 329 and is held thereby.

In order to vary the normal width of the opening between the guide links I have arranged the stops 330 so as to permit the arms 318 to swing into the path of the article to a greater or lesser extent. Referring to Fig. 21 it will be seen that the stop 330 is provided with two flattened sides one of which is in engagement with the extension 329. The stop 330 is pivoted in the bar 316 so that it can be turned to bring either flattened side in engagement with the extension 329. It will be seen that one of the flattened sides is a greater distance from the center of the pivot of the stop than the other and therefore when the stop is turned from the position shown to that in which the other flattened side is in engagement with the extension 329 the arm will be held farther from the center of the path of the article than is indicated in Fig. 21, thus providing a wider path for the article. All of the arms 318 are similarly held by adjustable stops so that the normal size of the path may be readily adjusted. It will be obvious that the stop 330 may be provided with more than two sides adapted to engage the extension 329 for the purpose of giving wider adjustment and I have shown two such adjustments merely for the purpose of illustration.

Referring to Figs. 7 and 9 it will be seen that the inner two of the uppermost links 318 on the opposite sides of the path of the article are connected with the lower ends of U shaped guides 331, the upper ends of which are supported by links 332 and pressed against the articles by means of springs 333. The U shaped guides 331 carry at their lower ends plates 334 having central ribs 335 adapted to form grooves or creases in the article. The outer two of the guides on opposite sides of the path of the article and alongside of the U shaped guide 331 are preferably of the construction shown in Fig. 21.

At the upper end of the vertical path of the article the bars 307 and 310 have secured thereto a plate 336 having a pad 337 at the top thereof. The bars 308 and 311 carry at their upper ends a similar plate 338 having a pad 339. The bar 307 carries a bracket 340 and the bar 310 carries a similar bracket 341, these brackets being oppositely arranged on the bars about the middle thereof. The bar 308 is similarly provided with a bracket 342 and the bar 311 with an opposing bracket 343. The brackets 340 and 341 are connected by a reinforcing plate 344 and the brackets 342 and 343 are connected by a similar plate 345.

The slide 256 in the way 100 has secured to the upper end thereof a bracket 346 and the opposing slide in the way 99 carries a similar bracket 347. The ends of these brackets carry arms 348 to which a plate 349 is secured, this plate thus tying the ends of the brackets together. The arms 348 carry horizontal racks 350 with which gears 351 on a shaft 352 mesh. The shaft 352 is moved back and forth parallel to itself by means of an oscillating arm 353 having a sliding connection with a square, vertical shaft 354 and being connected with the shaft 352 by a universal joint connection 355. The arm 353 is caused to move up and down on the shaft 354 by means of a bracket 356 which is secured to the bracket 346 and which is so connected with the hub of the arm 353 as to permit the latter to oscillate. The gears 351 roll on the racks 350 and maintain the shaft 352 parallel throughout the extent of its movement. The vertical shaft 354 is carried in bearings 357 and 358 and is oscillated by means of an arm 359 which is secured thereto and has througout the extent of its movement. The connected therewith one end of a link 360. The link 360 has its opposite end connected with one arm of a lever 361 (see Fig. 2). The lever 361 is pivoted on the cross member 49 of the frame and is oscillated by means of a cam 362 on the vertical shaft 141. Since the shaft 141 rotates with the shaft 67 it will be evident that the oscillation of the arm 353 will be in step with the reciprocation of the slides which carry the brackets 346 and 347. The shaft 352 carries at its center an arm 363 and on opposite sides of this arm carries brackets 364 and 365 (see Figs. 7 and 20). The brackets 346 and 347 have lugs 366 and 367, respectively, which carry a guide rod 368, this rod being parallel with the shaft 352 and supporting the arm 363 and the brackets 364 and 365. The brackets 364 and 365 have at their lower ends arms 364' and 365' similar to the arm 363, shown in Fig. 7, and these arms, as well as the arm 363, are provided with slots 369 through which the rod 368 passes. As will be clearly seen from Fig. 7 the end portions of the slots 369 are in offset relation to each other so that when the shaft 352 is moved toward the left, (Fig. 7), the end arm 363 and the brackets 364 and 365 will be caused to tilt downwardly a slight extent. The arms 363, 364' and 365' are for the purpose of folding the wrapper against the lower face of the article and also for elevating the article.

The platen 40 is elevated to substantially the level of the arm 363 in Fig. 7, it being understood that this arm and the arms 364' and 365' are withdrawn from the path of the article when the platen is elevated. The platen, therefore, carries the article to a position permitting the arms to be moved across the path to the rear of the article, the guide links on the sides of the path being pressed against the article with sufficient force to hold the same when the platen is lowered. As the article is held by the guide links the ends of the wrapper hang below the rear or bottom face of the article and therefore when the arms 363, 364', and 365' are moved toward the right in Fig. 7 one end of the wrapper is folded against the rear face of the article, the shape of the slots 369 being such that the arms are elevated toward the end of their inward movement to press the wrapper against the article.

The upper ends of the brackets 364 and 365 carry arms 370 and 371 which also project across the path of the article when the brackets are in the position shown in Fig. 7 and these arms are for the purpose of elevating the article which immediately precedes the one just referred to. When the arms 363, 364', 365', 370 and 371 are in the position shown in Fig. 7 they are moved upwardly with the platen, the arms 363, 364' and 365' being carried to a position a short distance below the position of the arm 371 in Fig. 7, it being understood that the parts of the machine are shown in a position in which the articles are elevated. After reaching the upper limit of their movement the arms are withdrawn from the path of the article, by the oscillation of the arm 353 and are then carried downward to their lowermost position which is a short distance below the position shown in Fig. 7, the arms thus traversing a substantially rectangular path.

Arranged on the opposite side of the path of the article, from the arms 363, 364' and 365', are a plurality of wrapper folding fingers 372 which are carried by a shaft 373, this shaft being carried by a frame 374 which swings on a fixed shaft 375. For the purpose of swinging the frame 374 to move the fingers 372 to and from the path of the article I have provided a lever 376 having its upper end pivoted to a bracket 377 and its lower end connected with a link 378 which is pivoted to the frame 374, as shown in Fig. 7. The lever 376 carries a cam roller 379 which engages a cam 380 on a shaft 381. The shaft 381 is supported in bearings 382 and 383 on the frame of the machine and carries a bevel gear 384 which meshes with a gear 385 on the shaft 141. Immediately after the platen 40 descends the fingers 372 move inwardly, being supported by a curved bracket 386 on which a roller 387 carried by the fingers is adapted to run. The shape of the bracket 386 is such that the fingers in moving toward the article dip downwardly and engage the hanging portion of the wrapper and carry the same against the rear face of the article. The arms 363, 364' and 365' then fold the opposite end of the wrapper against the rear face of the article and over the end which was folded by the fingers 372, the fingers 372 in the meantime having been withdrawn from the article. In moving into the path of the article the arms 363, 364' and 365' strike the wiper 359 and cause it to drop into the position shown in Fig. 7, the fingers 372 striking the wiper 362 and causing it also to drop.

Referring to Figs. 9 and 22, it will be seen that the brackets 342 and 343 carry a shaft 388 which has at one end thereof a pinion 389 arranged to mesh with the teeth 390 of a mutilated gear 391 on the shaft 381. The brackets 340 and 341 carry a similar shaft 392 which is operated by a mutilated gear 393 which is also on the shaft 381, the shafts 388 and 392 being operated in unison. The shaft 388 carries arms 394 adjacent the brackets 342 and 343 and these arms carry a rock shaft 395 and a shaft 396. The shaft 396 has secured thereto a plate 397 which is adapted to engage the rear face of the article. The shaft 396 also carries a plate 398 which is arranged at right angles to the plate 397 and is adapted to fold the portion of the wrapper, which extends from the end of the article, upwardly and against the end of the article when the shaft 396 is rocked. For the purpose of rocking the shaft 396 there is arranged thereon a small gear 399 which meshes with a segmental rack 400 on the shaft 395. The shaft 395 also carries an arm 401 having a cam roller 402 which is adapted to move in a cam 403 secured on the inner face of the bracket 343. The groove for the roller 402 in the cam 403 has an offset at the position of the roller in Fig. 9, this off-set being shown more clearly in the cam 404 on the bracket 341, Fig. 9. The parts are shown in Fig. 9 in the position in which the plate 398 has completed the fold in the wrapper. They remain in this position until after the article has been elevated, when the shaft 388 is rotated, this shaft carrying with it shafts 395 and 396 and the parts which are carried by these shafts. It will be seen that the groove in the cam 403 is of a slightly spiral form so that as the roller 402 travels upwardly in this groove from the position shown in Fig. 9 the shaft 395 will be rocked in the direction to swing the plate 398 to the right. It will be seen that by the time the shaft 388 has completed one-quarter of a revolution the roller 402 will have reached the part of the cam groove which is concentric with the center of the shaft 388 and therefore the plate 398 will remain in the position to which it has been rocked until the shaft 388 has completed a revolution.

In Fig. 9 there is shown immediately to the right of the roller 402 a roller 405, this roller being carried by a pin, which projects through slots in the bracket 343 and the cam 403 and is carried by a lever 406, this lever having its upper end pivoted on the bracket 343. When the shaft 388 completes a revolution the roller 402 is in substantially the same position as the roller 405 in Fig. 9, the roller 405 being in a position immediately to the right. In order to form a stop for the shaft 388 I have provided a dog 407, shown in connection with the cam 404, this dog being pivotally mounted and pressed downwardly by a spring 408, the dog yielding to a slight extent when engaged by the roller 402. Immediately after the roller 402 strikes the dog 407 the roller 405 is moved to rock the roller 402 into the position shown in Fig. 9, thereby rocking the shaft 395 and moving the plate 398 to a vertical position to fold a portion of the wrapper against the end of the article, thus effecting one of the end folds.

The lever 406 which carries the roller 405 is connected with one end of a link 409, the opposite end of this link being connected with a lever 410 which is pivoted on the bracket 343. The lever 410 carries a cam roller 411 (see Fig. 22) which engages a cam wheel 412 on the shaft 381, this cam wheel being so formed as to move the roller 405 at the proper time.

The shaft 392 operates a mechanism similar to that just described for effecting one of the folds in the wrapper at the opposite end of the article and therefore a detail description of this mechanism is not deemed to be necessary.

Mounted on substantially vertical shafts 413 at the four corners of the path of the article and immediately above the shafts 396 are plates or wings 414 adapted to be swung against the ends of the article to fold the side extensions of the wrapper against the ends. Mounted in suitable bearings above the shafts 396 are shafts 415 carrying mutilated gears 416 which mesh with pinions 417 on vertical shafts which are connected with the shafts 413 by universal joints 418 (see Figs. 1, 2 and 22). The shafts 415 have at one end crank arms 419 which are connected with actuating levers 420 by means of suitable links 421. The levers 420 have one end mounted on a fixed pivot 422 and carry rollers which engage a cam groove in the side of the cam wheels 423, the levers being thereby moved up and down to rock the shaft 415, the shaft being rocked to effect the successive operation of the wings 414 at each end of the article after the plate 398 has made one of the folds in the wrapper. When the wings 414 have completed the folds the elevating mechanism is actuated to raise the article to the next level and the wings are immediately swung outwardly. At this stage in the operations on the article all of the folds have been made in the wrapper with the exception of the extensions at the ends of the top or front face of the article and for the purpose of folding these extensions down over the other end folds and thus completing the folding operations I have provided the pivotally mounted plates 424 on opposite sides of the path of the article (see Figs. 7 and 9). The plates 424 are carried by frames 425 which are adapted to slide up and down vertically in suitable guides and have attached thereto racks 426 which are actuated by gears 427 on shafts 428. The shafts 428 are provided at one end with crank arms 429 which are connected with actuating levers 430 by means of suitable links 431. The actuating levers 430 have one end mounted on the fixed pivot 422 and carry cam rollers adapted to engage suitably formed cam grooves in the sides of the cam wheels 432, these cam wheels being arranged on the shaft 381. It is essential to have the plates 424 raised so as not to interfere with the operation of the wings 414 and at the same time it is essential to make the final end folds in the wrapper before the wings 414 are withdrawn, in order to prevent the wrapper from unfolding. I have therefore provided for lowering the plates 424 so as to make the final end folds in the wrapper simultaneously with the withdrawal of the wings 414 and therefore there will be no liability for the wrapper to unfold. The plates 424 normally stand across the path of the article but are swung to a vertical position as the article passes them and in order to provide grooves or creases in the article for the binders, which are applied in the next operation, the plates 424 have ribs 433 on their inner faces (see Fig. 9). The plates 424 are also provided with slots 434 in their inner ends in order to clear the binders which are arranged immediately above the plates and across the path of the article. The plates also prevent the binders from slipping off the articles.

After the article passes the plates 424 the end folds will be held in position against the ends of the article by the plates 336 and 338, the elevation of the article continuing until it is between the pads 337 and 339 with its lower edge substantially on the same level as the lower edges of the pads. When the article reaches this position plates 435, which are loosely arranged on the shafts 428, are swung in beneath the article and support it. The plates 435 are provided with slots 436 in their inner ends so as to clear the binders for the wrapper. Springs 437 are coiled on the shafts 428 and connect them with the plates 435 and normally tend to swing the plates inwardly toward the article. In order to swing the plates out of position beneath the article I have provided on the shafts 428 lost motion clutches 438 which are adapted to permit the shafts to rotate a certain amount before moving the plates 435.

*Binding and tying mechanism.*—Above the wrapper folding mechanism just described and slidably arranged on the under side of the top 50 are frames 439, 440, 441 and 442, the frames 439 and 440 being in alinement on opposite sides of the path of the article and the frames 441 and 442 being in alinement and arranged on opposite sides of the path of the article and movable at right angles to the line of movement of the frames 439 and 440. These frames support two rightangularly arranged cords or binders across the path of the article so that the article will engage the cords in its upward movement from the wrapper folding mechanism. The frame 439 is provided with a pin 443 which projects through a slot in the top 50 of the frame and carries a roller 444. This roller is arranged in a slot in a cam member 445 carried by a ring 446. The frame 440 is provided with a similar roller 447 which engages a cam member 448 on the ring 446. Cam members 449 and 450 on the ring 446 are engaged by the rollers carried by the frames 441 and 442, respectively. Referring to Fig. 5 it will be seen that the ring 446 is supported at 451, 452, 453 and 454 and engaged on its periphery by rollers 455 which are supported on suitable pivots 456. The frames 439, 440, 441 and 442 are reciprocated by means of the cam members 445, 448, 449 and 450, respectively, by oscillating the ring 446 and for this purpose there is secured to the ring a gear segment 457 which meshes with a segment 458 on the vertical shaft 459, this shaft being oscillated in timed relation with the other parts of the machine by a cam wheel 460 on the shaft 67 (see Figs. 8 and 34). A lever 461 has its lower end pivoted on the base 41 and its upper end connected with a link 462, this link being also connected with an arm 463 on shaft 459 (see Fig. 6).

One of the cords or binders is supplied from a cop which is arranged on a spindle 464 on the cross member 49 (see Fig. 2), the cord passing from the cop through a tension device 465' and from this tension device through an eye 466 of a needle 467 carried by the frame 442. From the needle the cord extends across the path of the article to a gripper 468 on the frame 441, (see Fig. 9). One of these grippers is shown in detail in Figs. 36 to 38. The gripper shown in these figures is carried by the frame 439 and consists of an arm 469 secured to the frame and having a V shaped slot 470 in its inner end. On the lower side of the arm 469 is arranged a disk 471 having a finger 472 projecting from one side thereof and adapted to be moved across the slot 470 in either direction. A similar disk 473 is arranged on the upper side of the arm 469 and is provided with a finger 474 which is also adapted to move across the slot 470. As indicated in Fig. 37, the lower edges of the slot 470 are rounded whereas the upper edges of the slot are sharpened to coöperate with the finger 474 to form a shear for the purpose of cutting the cord. The disks 471 and 473 are arranged on a square shaft 475 which is oscillatably mounted in the arm 469 and in an extension 476 on the frame 439. The shaft 475 has a pin 477 therein and between this pin and the disk 473 is a spring 478 which is adapted to yieldably hold the disks 471 and 473 against the opposite sides of the arm 469. The end of the cord above referred to is clamped between the finger 472 and the under side of the disk 470, the spring 478 yielding sufficiently to permit this.

The other cord is supplied from a cop on a spindle 479 on the cross member 47 (see Fig. 1). From the cop the cord passes through an eye in the arm 479' and a tension device 479" and thence through an eye 480 in a needle 481 carried by the frame 440 and from this eye the cord is led across the path of the article to the gripper 472 (see Fig. 7).

As the article moves upwardly the cords are drawn from the cops and are arranged across the front or top of the article and down the sides and ends thereof. When the article reaches the position between the pads 337 and 339, the frames 339, 340, 341 and 342 are moved inwardly, the plates 435 being, at the same time, swung upwardly against the rear face of the article. Plates 482, shown in Fig. 7, are also swung against the rear face of the article, the purpose of all of these plates being to protect the wrapper and prevent its being torn by the frames as the latter move across the path of the article. The plates 482 are preferably moved by positively actuated mechanism and in Fig. 7 the plate 482 on the left is shown as having connected therewith a link 482' having laterally projecting pins 482" which engage the upper and lower sides of the bar 492 and slide on the same. The link 481' also has a downwardly projecting arm 482''' on which is coiled a spring 482'''' this spring engaging the frame 440 and yieldably swinging the plate 482 against the article as the frame moves inwardly. The bar 492 is thickened at its inner end and this thickened portion engages the pins 482" when the frame 440 moves outwardly and thus draws the plate 482 away from the article. In order to prevent the wrapper at the lower corners of the article, adjacent the plates 482, from being pinched so that it will be cut by the cords when the latter are drawn taut, I have provided miniature folders 483 which are pivotally mounted and are swung against the corners of the article by the plates 482, these folders turning the wrapper at the corners so as to prevent its being pinched by the plates 482.

The tension devices 465' and 479' are carried by the frames 442 and 440, respectively, and are shown in detail in Fig. 7. The cord passes through an opening 484 and is adapted to be pressed against the lower side of the opening by a plunger 485, this plunger being pressed downwardly by a spring 486 in a second plunger 487. The latter plunger is normally pressed upwardly by a spring 488, but at the proper instant is forced down to tightly hold the cord by means of a lever 489, each of the frames 440 and 442 being provided with one of these levers.

As shown in Fig. 9, the frames 441 and 442 carry bars 490 and 491, respectively, at their inner ends, these bars having recesses at their inner ends, as shown in Fig. 43. The ends of the cord are engaged by these bars and brought to the center of the rear face of the article, the bars being substantially in the relation shown in Fig. 43 when the frames 441 and 442 reach their innermost position.

From Fig. 5 it will be seen that the shape of the cams 448, 449 and 450 is such that the frames 440, 441 and 442 will be moved to their innermost position ahead of the frame 439, which is moved by the cam 445. It will also be evident that the frame 439 will be carried a slightly greater distance than the other frames. The frame 440 is provided with a bar 492, similar in function to the bars 490 and 491, and which is provided with a V shaped recess in its inner end. The bar 492 carries one end of the other cord to the center of the article and when at its innermost position the recess in the inner end of the bar 492 will coöperate with the recesses in the bars 490 and 491 to form a substantially circular opening in which three of the cord ends are arranged. The frame 439 is provided with a bar 493 having a relatively deep V shaped recess in its inner end, as shown in Fig. 29. The bar 493 carries the fourth cord end to the center of the article and, on account of moving inwardly a greater distance than the other bars, all four of the cord ends will be closely gathered in the bottom of the recess in the bar 493, the bar 492 being yieldingly held by a spring 492' (see Fig. 40) to permit the cords to be pinched by the bars. Just before the frames 440 and 442 reach the innermost position, the ends of small arms 494 on the levers 489 engage fixed abutments 495 (see Figs. 1 and 3), secured on the under side of the top 50 of the frame, and press the levers 489 downwardly to cause the tension devices 465' and 479' to grip the cord and hold the same. The frames 440 and 442 move inwardly a sufficient distance to permit the arms 494 to become disengaged from the abutments 495 so as to release the cord. The effect of holding the cords for a short period is to cause them to be drawn tightly around the article and to take up whatever slack there may be in them. When the frames 440 and 442 move outwardly the arms 494 again engage the abutments 495 but the levers 489 are not depressed because the arms are turned on their pivots, suitable springs 494' shown in Fig. 39 being provided for the purpose of restoring the arms to the position shown in Figs. 7 and 9 after they have passed the abutments 495. The arms are held in the position shown in Figs. 7 and 9 by suitable stops 496 on the levers 489.

The frames 439 and 440 carry coöperating arms 497 and 498 having V shaped recesses in their inner ends which inclose the ends of the cords when the frames are at their innermost position. After the arms 497 and 498 come together and inclose the ends of the cords the cord cutters and grippers are actuated. At this instant the needle 467 is arranged below the gripper 468 and holds the cord in the slot 470 so that when the fingers 472 and 474 are carried across the slot 470 the end which has been theretofore held by the finger 472 will be released and the cord immediately above the needle will be gripped by the finger 472, the finger 474 at the same instant severing both ends so as to cut the cords which surround the article from the supply section.

The shaft 475 is oscillated for the purpose of moving the fingers 472 and 474 to effect the cutting and gripping of the cords, by means of a slidable bar 499 which has its inner end guided by a yoke 500, the bar being movable laterally in the yoke (see Figs. 36 and 37). The upper end of the shaft 475 has secured thereon a head 501 provided with the upwardly projecting pins 502 and 503. The bar 499 is provided with shoulders 504 and 505 on opposite sides thereof, these shoulders being adapted to alternately engage the pins 502 and 503, respectively, the shoulder 505 being shown in Fig. 36 in engagement with the pin 503. With the parts in this position it will be readily understood that a movement of the bar 499 toward the left will effect a rocking movement of the shaft 475 which will carry the fingers 472 and 474 to the opposite side of the slot 470. The bar 499 has pivoted on the upper side thereof members 506 and 507, the inner ends of which are pressed apart by a spring 508 and the outer ends of which are adapted to engage a stop pin 509, as shown in Fig. 36. When the head 501 is turned, as above described, the pin 502 is carried toward the right, in Fig. 36, and when the bar 499 is moved toward the right the engagement of the inclined surface 510, of the member 507, with the pin 503 will cause the inner end of the bar 499 to be shifted laterally so that when the bar 499 reaches the limit of its movement toward the right the shoulder 504 will be in engagement with the pin 502 and the next movement of the bar 499 toward the left will swing the fingers 472 and 474 across the slot 470 in the reverse direction, the inner end of the bar 499 being then shifted on the succeeding movement toward the right to bring the shoulder 505 again in engagement with the pin 503.

The reciprocation of the bar 499 on the frame 439 is effected by having the bar connected with a slidable rod 511 by means of an arm 512, the bar 499 being pivoted to this arm. The rod 511 is reciprocated by mechanism described hereinafter.

The cord cutting and gripping machine carried by the frame 441 is actuated by a bar 499' which is generally similar to the bar 499' above described. For the purpose of actuating the bar 499' there is arranged on the frame 441 a vertical shaft 650 having an arm 651 to which the bar 499' is pivoted. The shaft 650 also carries an arm 652 having a roller 653 at its outer end. A spring 654 is coiled on the shaft 650, and has one end secured in the lower side of the arm 652 and the other end in engagement with a post 655 which is secured in the frame 441. The spring 654 is for the purpose of swinging the shaft 650 to draw the bar 499' outwardly and the movement is limited by the arm 651 engaging the post 655. The shaft 650 is turned in opposition to the spring 654 by means of a lever 656 which is pivoted at 657 to the top 50 of the frame. The lever 656 has its free end 658 arranged to engage the roller 653 when the frame 441 is at its innermost position and from Fig. 44 it will be seen that a movement of the lever 656 toward the right will rock the shaft 650 to move the bar 499' inwardly, and thus actuate the cord cutting and gripping mechanism. In order to actuate the lever 656 at the proper time the lever is provided with an up-standing post 659 which projects through a slot 660 in the top 50 and this post is engaged by a bracket 661 on the ring 446 just before the ring reaches the end of its movement toward the right in Fig. 44. From this figure it will be seen that the cam 449 will have moved the frame 441 to its innermost position before the post 659 is engaged by the bracket 661 and therefore the lever 656 will not be actuated until the roller 653 is in position alongside of the end 658 of the lever. Upon the return movement of the ring 446 the lever 656 is returned by means of the spring 662 which has one end connected with the lever 656 and the other end with a fixed hook 663 on the top 50.

After the cords have been severed from the supply sections they are held at the center of the rear face of the article by the bars 492 and 493 and by the arms 497 and 498, the latter holding the free ends of the cords. The cords are now in position to be seized by the knot forming mechanism which is carried by the frame 439. Referring to Fig. 30 it will be seen that the arm 497 has a member 513 pivoted thereto at 514, a spring 515 being provided for the purpose of holding the member 513 against the abutment 516 which is secured to the arm 497. The purpose of the member 513 is to secure the cords against accidental displacement out of reach of the knot forming mechanism. As the cord enters the slot in the arm 497 the member 513 is swung away from the abutment 516 to permit the cord to enter the recessed portion 517 in which it remains until withdrawn by the knot forming mechanism.

Referring to Fig. 28 it will be observed that the cords, being held in the V shaped recesses in the bar 493 and the arm 497, will be in position to enter between the open jaws 518 and 519 carried by the revolving head 520 when the latter is moved inwardly (see also Fig. 32). The head 520 has secured thereto a gear 521 and is rotatably mounted on a tube 523. The tube 523 is supported in the frame 439 and carries on its interior a slidable rod 524 having a hook 525 at its inner end. The gear 521 has in mesh therewith a pinion 526 (see Fig. 7), which is mounted on a shaft 527, this shaft having on its opposite end a gear wheel 528 which is rotated by a gear 529 on a shaft 530. The shaft 530 also carries a bevel gear 531 which meshes with a gear 532 on a shaft 533. The shaft 533 is provided with universal joints 534 and is connected with a shaft carrying a bevel pinion 535 which is adapted to mesh with and be rotated by a mutilated gear 536 on the shaft 141. The universal joints just referred to permit the frame 439 to move to and fro without disturbing the driving connection between the gear 532 and the gear 535.

The gear wheel 521 has secured thereto a collar 537 to which is attached a rod 538. The rod 538 carries an arm 539 having a cam roller 540 thereon which engages a cam 541 on the shaft 530, this cam sliding the rod 538 together with the gear 521 and head 520 axially on the tube 523. The arm 539 is extended to slide on the rod 524, this shaft serving as a guide for the arm and preventing it being turned about the rod 538 by the cam 541. The rod 511 is moved axially by a cam 542 on the shaft 530, the rod having secured thereon an arm 543 having a cam roller 544 which engages the cam 542. The arm 543 has an extension 545 which engages the shaft 527 and slides thereon, the arm 543 being thereby prevented from being turned by the cam 542.

The rod 524 has secured thereto an arm 546 which is provided with an extension 547 engaging the shaft 527 whereby the arm is prevented from turning. The arm 546 is engaged by a lever 548 which is pivoted on the frame 439 at 549 and carries a cam roller 550 which engages a cam 551 on the shaft 530. The lever 548 has an arm 552 which carries a cam roller 553 adapted to engage a fixed cam 554 on the top 50 of the frame (see Fig. 4). A spring 555 surrounds the rod 524 and has one end in engagement with the tube 523 and its other end in engagement with the extension 547 so that when the rod 524 is moved toward the left in Fig. 27 the spring 555 will be compressed and will move the rod toward the right when the lever 548 is released by the cams 551 and 554.

In the operation of the knot forming mechanism the cam 541 moves the head 520 inwardly on the tube 523 until the cords, which are held in the arms 493 and 497, as above described, are opposite the recesses 556 in the grippers 518 and 519. At this instant the grippers automatically close on the cords and as they rotate carry these ends around the inner end of the tube 523. The grippers are closed by means of a spring 557, shown in Fig. 35. The gripper 519 is pivoted on the head 520 and the spring 557 which is coiled on the pin 558 has one of its ends in engagement with a pin 559 on the gripper 519 and tends to close the latter. The gripper 519 carries on its side a pin 560 which engages a cam surface 561 on the frame 439 (see Fig. 28), to effect an opening movement of the gripper 519 as the head 520 is rotated. When the cords are opposite the recesses 556 in the grippers the pin 560 passes off the end 562 of the cam 561 and the spring 557 closes the gripper 519. The grippers, rotating in the direction of the arrow, Fig. 28, carry the ends of the cord around the tube 523, the cord being laid in the groove 563. As the grippers make the first revolution around the tube 523 the head 520 is drawn rearwardly to permit the inner ends of the grippers to pass the portion of the cords which extends from the tube 523 upwardly to the article. Immediately after the grippers have passed this point they are suddenly moved inwardly to cross the free ends of the cord over the loop which has been formed on the tube 523 and to lay the ends across the end of the tube and in the recess 564 in the end of the rod 524, this rod having in the meantime been moved inwardly to carry the recess 564 out of the tube. As soon as the ends of the cord are laid in the recess 564 the rod 524 is permitted to spring back into the tube so that the hook 525 will grip the cord ends and securely hold them. After this has been accomplished the mechanism carried by the frame 440 is brought into play to slip the loop off the tube 523 and carry it upwardly to the article.

Referring to Figs. 39 to 42 it will be seen that the frame 440 carries a shaft 565 which is driven from a fixed shaft 566 through a shaft 567 which is provided with the necessary universal joints which permit the movement of the frame 440 (see Figs. 3 and 4). The shaft 566 carries a bevel gear 568 which meshes with a mutilated gear 569 on a shaft 570 carried by the frame of the machine. The shaft 570 carries a bevel gear 571 which meshes with a gear 572 on the shaft 141. The frame 440 also carries a shaft 573 on which is arranged an arm 574 having a lateral extension 575 on its hub which is arranged in the forked end 576 of an arm 577 which is pivoted on a block 578 so as to have universal movement with respect to the shaft 573. Between the extension 575 and the opposite arm of the forked end 576 is a comparatively stiff spring 579. This connection between the arm 574 and the arm 577 enables the former to be moved by the latter and at the same time have universal movement with respect thereto and permits the arm 574 to be moved after the arm 577 reaches the limit of its upward movement, on account of the spring 579 yielding.

The arm 574 is rocked by means of a rod 580 which has its rearward end connected with the upper end of a lever 581, the lower end of this lever being arranged on a pivot 582 carried by the frame 440. The lever 581 carries a cam roller which is arranged in a cam groove on one side of the cam wheel 583, the arrangement being similar to that shown in Fig. 40 for operating the lever 584. The inner end of the lever 577 carries a roller 585 which is arranged in a cam groove 586 in the inner face of the frame 440. From Fig. 41 it will be evident that as the arm 577 moves upwardly from the position shown it will also be carried sidewise or laterally to a certain extent, this lateral movement being for a purpose to be described hereinafter.

Pivoted to the inner end of the arm 577 is a disk 587 having thereon an upwardly pointed hook 588. The disk 587 carries a pin 589 which is engaged by a lever 590, this lever also being pivoted to the arm 577, as shown in Fig. 40. Arranged on the pivot of the disk 587 and movable independently of the disk is a hook shaped arm 591, the hook of which embraces the edge of the disk 587, as shown in Fig. 41. The arm 591 has an extension 592 to which is pivoted a link 593, this link and the lever 590 having a common pivotal connection with a rod 594.

From Fig. 40 it will be seen that when the rod 594 is moved toward the left the arm 591 will be swung upwardly toward the hook 588 and, on account of the pin 589 being engaged by the lever 590, the disk 587 will be swung in the opposite direction to carry the hook 588 toward the arm 591.

For the purpose of moving the rod 594 it is connected with one arm of a lever 595, this lever being pivoted on the shaft 573. The upper arm of the lever 595 has pivoted thereto a rod 596, this rod being connected with and actuated by the lever 584.

As shown in Fig. 40 a spring 597 connected with the lever 577 and with the frame 440 is adapted to assist in raising this arm. A spring 598 is connected with the disk 587 and with the arm 577 and tends to swing the disk in the direction to carry the hook 588 downwardly.

The manner in which the loop is drawn from the tube 523 will now be described. Referring to Fig. 28 it will be seen that the tube 523 has a longitudinal groove 599 in the under side thereof. After the ends of the cords have been gripped by the hook 525, in the manner described hereinabove, the mechanism carried by the frame 440 is actuated to carry the arm 577 upwardly, the hook 588 engaging the groove 599 at a point in the rear of the loop which has been laid on the tube 523. The frames 439 and 440 are then moved outwardly in succession and the hook 588 engages the loop in the cords and draws the same off the end of the tube 523. The ends of the cords being held by the hook 525 and the lever 577 continuing in its upward movement as the frame 440 is withdrawn, it will be seen that the loop will be carried upwardly to the rear face of the article. In order to hold the cords at the center of the article as the frame 439 is withdrawn the bar 493 is maintained at its innermost position by means of a latch 600 which is arranged on a pivot 601 carried by the top 50 (see Fig. 29). The bar 493 is slidably mounted on the frame 439, being arranged in guides 602 and 603 on the frame. The bar 493 has a lateral extension 604, the end of which is engaged by the latch member 600, the latch member being held against the extension 604 by a spring 605 carried by the top 50. The bar 493 has pivoted thereto a block 606 which has a sliding connection with a lever 607 pivoted on the top of the frame 439 at 608. As the frame 439 moves outwardly the pivot 608 will, of course, be carried with it and the lever 607 will be swung into the position shown in dotted lines.

From Fig. 28 it will be observed that the tube 523 is arranged slightly to one side of the center of the path of the article, the V shaped recess in the bar 493 being substantially on this center line. Therefore, in order to bring the loop to the center of the article it is necessary to give the hook 588 a lateral movement and this is accomplished by the cam wheel 586. When the hook 588 has moved upwardly to the bar 493 the frame 439 will have moved outwardly a sufficient distance to draw the ends of the cords taut. At this instant the rod 594 is actuated to move the hook 588 downwardly and the arm 591 upwardly, thus stripping the loop from the hook and permitting the loop to be drawn tight. Immediately after this occurs the rod 524 is moved inwardly to permit the hook 525 to release the ends of the cord.

At about the instant that the cords are released by the hook 525 a roller 609 carried on the top of the frame 439 strikes the toe 610 of the latch member 600 and throws the latch member out of engagement with the extension 604. At this same instant the end 611 of the lever 607 strikes a roller 612 carried by the top 50 and swings the lever from the dotted position shown in Fig. 29, to the position in full lines, as the frame 439 continues its outward movement. This swinging of the lever 607 withdraws the bar 493.

Since the shaft 530 is not being rotated while the frame 439 is being withdrawn, on account of the driving pinion 535 being opposite the blank portion of the gear 536, it is necessary to provide means for actuating the lever 548 independently of the cam 551, for the purpose of releasing the ends of the cord which are held by hook 525. This means consists of the cam 554 which is carried by the top 50, this cam being engaged by the roller 553 as the frame 439 is moved outwardly and shifting the lever 548 to permit the hook 525 to release the cords.

The frames 439, 440, 441 and 442, being withdrawn to their outermost position, the parts are in the position to apply the binders to the next succeeding article. As hereinabove described, the cord grippers 468 and 472 grip the supply sections at the same instant that the portions which are around the article are severed from the supply sections and therefore when the frames are moved outwardly the grippers will still retain the ends of the cords and when the frames reach their outermost position there will be two right-angularly arranged cords across the path of the article which will be engaged by the succeeding article in its upward movement and the operation of binding and tying will be repeated.

The succeeding article will strike the under side of the article which has just been tied and force the same upwardly and out from between the pads 337 and 339. This article will then be engaged by the horizontally movable plate 613 and carried to the bottom plate 614 of the delivery chute. The plate 613 is carried at its opposite ends by the slides 615 and 616 which are movable on the rods 617 and 618, respectively, these rods being supported at their ends by brackets 619 on the top 50. The plate 613 has secured thereto a bracket 620 to which is pivoted one end of a link 621, the opposite end of this link being connected with an arm 622 on the upper end of the shaft 459, the oscillation of this shaft effecting the movement of the plate 613. The plate 613 is moved a sufficient distance to carry the article out of the way of the next succeeding article and when the latter has been elevated it will be moved against the first article and shove the latter forwardly in the delivery chute. Any preferred means may be provided for handling the articles from the delivery chute and as such means forms no part of the present invention the same has been omitted from this application.

On account of the rules of classification in the Patent Office all of the claims of this application are directed to the combinations of mechanisms for wrapping, binding and tying articles of different sizes, the claims to the details of the different mechanisms which make up these combinations being reserved for divisional applications.

Having thus described my invention what I claim is:

1. The combination of means for applying a wrapper to an article, means for passing a plurality of binders around the article in right-angularly disposed planes to secure the wrapper thereon, and means for securing the ends of the binders.

2. The combination of means for applying a wrapper to an article, means for passing a plurality of binders around the article in right-angularly disposed planes to secure the wrapper thereon, and means for tying the ends of the binders.

3. The combination of means for applying a wrapper to an article, means for passing a plurality of binders around the article to secure the wrapper thereon, and means for grouping and securing all of the ends of the binders together.

4. The combination of means for applying a wrapper to an article, means for passing a plurality of binders around the article to secure the wrapper thereon, and means for grouping and tying all of the ends of said binders together.

5. The combination of means for applying a wrapper to an article, means for passing binders around all of the faces of the article, and means for securing the ends of the binders.

6. The combination of means for applying a wrapper to an article, means for passing binders around all of the faces of the article, and means for tying the ends of the binders.

7. The combination of means for applying a wrapper to an article, means for passing binders around all of the faces of the article, and means for grouping and securing all of the ends of the binders together.

8. The combination of means for applying a wrapper to an article, means for passing binders around all of the faces of the article, and means for grouping and tying all of the ends of said binders together.

9. The combination of means for applying a wrapper to an article, means for passing two binders around the article in right-angularly disposed planes, and means for grouping and securing all of the ends of the binders together.

10. The combination of means for applying a wrapper to an article, means for passing two binders around the article in right-angularly disposed planes, and means for grouping and tying all of the ends of said binders together.

11. The combination of means for applying a wrapper to an article, means for passing two binders around the article in right-angularly disposed planes, and means for grouping and tying all of the ends of said binders together at one of the points of intersection of the binders.

12. The combination of means for applying a wrapper to an article, means for passing two binders around the article in right-angularly disposed planes, and means for grouping the ends of the binders together and for tying the ends in a single knot contiguous to one of the faces of the article.

13. The combination of means for applying a wrapper to an article, means for passing two binders around the article in right-angularly disposed planes, means for grouping the ends of the binders together at the center of one of the faces of the article, and means for tying the ends in a single knot.

14. In a machine of the class described, the combination of means for feeding an article into the machine, means for feeding a wrapper to a position to be applied to the article, means for folding the wrapper on the article, means for passing two binders around the article in right-angularly disposed planes, and means for grouping and securing all of the ends of the binders together.

15. In a machine of the class described, the combination of means for feeding an article into the machine, means for feeding a wrapper to a position to be applied to the article, means for folding the wrapper on the article, means for passing two binders around the article in right-angularly disposed planes, and means for grouping the ends of all of the binders together and for tying the ends in a single knot contiguous to one of the faces of the article.

16. In a machine of the class described, the combination of means for feeding an article into the machine, means for feeding a wrapper to a position to be applied to the article, means for folding the wrapper on the article, means for passing two binders around the article in right-angularly disposed planes, means for grouping the ends of the binders together at the center of one of the faces of the article, and means for tying the ends in a single knot.

17. In a machine of the class described, the combination of means for feeding an article into the machine, means for feeding a wrapper to a position to be applied to the article, means for moving the article against the wrapper, means for folding the wrapper against certain faces of the article while in motion, means for intermittently stopping and moving the article, means for making the remaining folds in the wrapper while the article is stationary, means for passing a cord around the article, and means for tying the ends of the cord.

18. In a machine of the class described, the combination of means adapted to intermittently translate an article in a fixed path, means for placing a wrapper in the path of the article, means for folding the wrapper on the article, means for holding a binder in the path of the article, means for bringing the ends of the binder together in the rear of the article, and means for securing said ends together.

19. In a machine of the class described, the combination of means adapted to intermittently translate an article in a rectilinear path, means for placing a wrapper in the path of the article, means for folding the wrapper on the article, means holding a binder in the path of the article, means for bringing the ends of the binder together in the rear of the article, and means for tying said ends together contiguous to the rear face of the article.

20. In a machine of the class described, the combination of means adapted to intermittently translate an article in a rectilinear path, means for placing a wrapper in the path of the article, means for folding the wrapper on the article, means for holding a plurality of binders in different planes in the path of the article, means for bringing the ends of the binders together in the rear of the article, and means for tying said ends, contiguous to the rear face of the article.

21. In a machine of the class described, the combination of means adapted to intermittently translate an article in a rectilinear path, means for placing a wrapper in the path of the article, means for folding the wrapper on the article, means for holding two right-angularly arranged binders in the path of the article, means for bringing the ends of the binders together in the rear of the article, and means for tying all of said ends in a single knot.

22. In a machine of the class described, the combination of means adapted to intermittently translate an article in a rectilinear path, means adapted to sever a wrapper from a continuous strip and place the same in the path of the article, means for folding the wrapper against certain faces of the article while in motion, means for making the remaining folds in the wrapper while the article is stationary, means adapted to pass a binder around a plurality of the faces of the article while the latter is in motion, and means adapted to bring the ends of the binder together in the rear of the article while stationary.

23. In a machine of the class described, the combination of means adapted to intermittently translate an article, means adapted to sever a wrapper from a continuous strip and place the same in the path of the article, means for folding the wrapper against certain faces of the article while in motion, means for making the remaining folds in the wrapper while the article is stationary, means adapted to pass two right-angularly arranged binders around certain faces of the article while in motion, means adapted to bring the ends of the binders together in the rear of the article, and means for tying all of the ends in a single knot.

24. In a machine of the class described, the combination of a continuously operating article feeding mechanism, wrapper feeding mechanism, folding mechanism, binding and tying mechanism, and means adapted to be actuated by an article entering the machine, for automatically setting the wrapper feeding, folding, binding and tying mechanisms into operation.

25. In a machine of the class described, the combination of a continuously operating article feeding mechanism, means for moving the article transversely of said feeding mechanism, means for placing a wrapper in position to be engaged by the article, means for folding the wrapper on the article, means for placing a binder on the article and for tying the same, and means for delivering the article from the binding and tying means.

26. The combination of means for applying a wrapper to an article, means for creasing certain faces of the article, means for placing a binder around the article and in said creases, and means for securing the ends of the binder.

27. The combination of means for applying a wrapper to an article, means for creasing a wrapper to an article, means for creas-placing a binder around the article and in said creases, and means for tying the ends of the binder together.

28. The combination of means for applying a wrapper to an article, means for creasing certain faces of the article, means for passing a plurality of binders around the article and in said creases, and means for securing the ends of the binders.

29. The combination of means for applying a wrapper to an article, means for creasing certain faces of the article, means for passing a plurality of binders around the article and in said creases, and means for tying the ends of the binders together.

30. The combination of means for applying a wrapper to an article, means for creasing certain faces of the article, means for passing a plurality of binders around the article and in said creases, and means for grouping and securing all of the ends of the binders together.

31. The combination of means for applying a wrapper to an article, means for creasing certain faces of the article, means for passing a plurality of binders around the article and in said creases, and means for grouping and tying all of the ends of said binders together.

32. The combination of means for applying a wrapper to an article, means for creasing four of the faces of the article, means for passing two binders around the article and in said creases, said binders being arranged in right-angularly disposed planes, and means for grouping and securing all of the ends of the binders together.

33. The combination of means for applying a wrapper to an article, means for creasing four of the faces of the article, means for passing two binders around the article and in said creases, said binders being arranged in right-angularly disposed planes, and means for grouping and tying all of the ends of said binders together.

34. In a machine of the class described, the combination of means for applying a wrapper to an article, means for translating the article in a substantially straight path, means for holding two right-angularly arranged binders in the path of the article, means adapted to move transversely of said path for bringing the ends of the binders together in a group at the rear of the article, and means for securing said ends together.

35. In a machine of the class described, the combination of means for applying a wrapper to an article, means for translating the article in a substantially straight path, means for holding two right-angularly arranged binders in the path of the article, means adapted to move transversely of said path for bringing the ends of the binders together in a group at the rear of the article, means adapted to grasp the ends of the binders and form a loop therein at a point removed from the article, and means for sliding the loop against one of the faces of the article.

36. The combination of means for moving an article in a substantially straight path, means for folding a wrapper thereon while traversing said path, means for passing a binder around the article to secure the wrapper thereon, means arranged to move toward the article from opposite sides thereof to bring the ends of the binder together in the rear of the article, means forming the ends of the binder in a loop, and means for drawing the loop against the article.

37. The combination of means for folding a wrapper on an article, means for passing a binder around the article, means arranged to move toward the article from opposite sides thereof to bring the ends of the binder together, means for forming the ends of the binder in a loop, and means for drawing the loop against the article.

38. The combination of means for folding a wrapper on an article, means for passing a plurality of binders around the article, means arranged to move toward the article to bring the ends of the binders together, means for forming the ends of the binders in a loop, and means for drawing the loop against the article.

39. The combination of means for folding a wrapper on an article, means for passing two binders around the article at right angles, means arranged to move from the sides toward the center of one face of the article to bring the ends of the binders together, means for forming the ends of the binders in a loop, and means for drawing the loop against the article.

40. The combination of means for folding a wrapper on an article, means for passing two binders around the article at right angles to each other, separate means adapted to bring each of the ends of the binders to a position adjacent one of the faces of the article, and means adapted to grasp all of said ends simultaneously and tie the same together.

41. The combination of means for moving an article in a definite path, means for folding a wrapper on the article while traversing said path, means for passing a binder around the article, means for grouping the ends of the binder together at the rear of the article and for forming a loop therein, and means arranged to move toward the article from the rear thereof and draw said loop against the article.

42. The combination of means for applying a wrapper to an article, means for moving the article with the wrapper thereon along a definite path, means on one side said path for securely holding the end of a cord, means on the opposite side of the path adapted to loosely hold the cord with a portion thereof extending across said path, means adapted to move one of said cord holding means across said path, means for severing a section of the cord from the supply, and means for simultaneously releasing the severed section, so that it may be carried along with the article, and for gripping the end of the supply section of the cord.

43. The combination of means for applying a wrapper to an article, means for moving the article with the wrapper thereon along a definite path, means on one side of said path for securely holding the end of a cord, means on the opposite side of the path adapted to loosely hold the cord with a portion thereof extending across said path, means for moving the latter cord holding means across said path, and means associated with said first mentioned cord holding means for simultaneously severing a section of the cord from the supply, releasing the severed section, and gripping the supply section of the cord.

44. The combination of means for applying a wrapper to an article, means for moving the article with the wrapper thereon along a definite path, means at the side of the path for securely holding the ends of a plurality of cords, oppositely arranged means for loosely holding the cords with portions thereof extending across said path, means for moving the latter cord holding means across said path, and means associated with said first-mentioned cord-holding means for simultaneously severing a section from each cord, releasing the several sections and gripping the supply sections of the cords.

45. The combination of means for applying a wrapper to an article, means for moving the article with the wrapper thereon along a definite path, means on two sides of the path for securely holding the ends of two cords, means oppositely arranged with respect to said first mentioned holding means for loosely holding said cords with portions thereof extending at right angles across said path, means for moving the latter cord-holding means across said path, and means for severing sections from said cords, releasing the severed sections so that they may be carried along with the article, and gripping the ends of the supply sections of the cords.

46. The combination of means for applying a wrapper to an article, means for moving the article with the wrapper thereon along a definite path, means on two sides of the path for securely holding the ends of two cords, means oppositely arranged with respect to said first-mentioned holding means for loosely holding said cords with portions thereof extending at right angles across said path, means for moving the latter cord-holding means across said path, and means associated with said first-mentioned cord-holding means for simultaneously severing sections from said cords, releasing the severed sections, and gripping the ends of the supply sections of the cords.

47. The combination of means for applying a wrapper to an article, means for moving the article with the wrapper thereon along a definite path, means on two sides of the path for securely holding the ends of two cords, means oppositely arranged with respect to said first-mentioned holding means for loosely holding said cords with portions thereof extending at right angles across said path, means for moving the latter cord-holding means across said path, means for severing sections from said cords, releasing the severed sections so that they may be carried along with the article, and gripping the ends of the supply sections of the cords, and means for retracting said latter cord-holding means to position the cords across said path.

48. The combination of means for applying a wrapper to an article, means for moving the article with the wrapper thereon along a definite path, means on two sides of the path for securely holding the ends of two cords, means oppositely arranged with respect to said first-mentioned holding means for loosely holding said cords with portions thereof extending at right angles across said path, means for moving the latter cord-holding means across said path, means associated with said first-mentioned cord-holding means for simultaneously severing sections from said cords, releasing the severed sections, and gripping the ends of the supply sections of the cords, and means for retracting said latter cord-holding means to position the cords across said path.

49. The combination of means for moving an article along a definite path, means for folding a wrapper on the article, means at one side of said path for securely holding the end of a binder, means on the opposite side of said path for loosely holding the binder with a portion thereof extending across said path so as to be engaged by the article moving therealong, means for stopping said article moving means after the article has passed said binder-holding means, means for moving one of said binder-holding means across said path in the rear of the article so that the latter is encircled by the binder, means for severing the section of the binder, encircling the article, from the supply section, means for releasing the severed section from said holding means, and for gripping the end of the supply section, means for securing the ends of the severed section together, and means for retracting said binder-holding means to position the binder across said path.

50. The combination of means for moving an article along a definite path, means for folding a wrapper on the article, means at one side of said path for securely holding the end of a binder, means on the opposite side of said path for loosely holding the binder with a portion thereof extending across said path so as to be engaged by the article moving therealong, means for stopping said article moving means after the article has passed said binder-holding means, means for moving said second-mentioned binder-holding means across said path in the rear of the article so that the latter is encircled by the binder, means for severing the section of the binder, encircling the article, from the supply section, means for releasing said severed section from said holding means and for gripping the end of the supply section, means for tying the ends of the severed section of the binder together, and means for retracting said second-mentioned binder-holding means to position the binder across said path.

51. The combination of means for moving an article along a definite path, means for folding a wrapper on the article, means situated on adjacent sides of said path for securely holding the ends of two right-angularly disposed binders, coöperating means opposite said holding means for loosely holding portions of said binders across said path, so as to be engaged by the article moving therealong, means for stopping said article moving means after the article has passed said binder-holding means, means for moving said second-mentioned binder-holding means across said path in the rear of the article so that the latter is encircled by the binders, means for severing the sections of the binders, encircling the article, from the supply sections, means for releasing the severed sections from said holding means and for gripping the ends of the supply sections, means for tying the ends of the severed sections together, and means for retracting said binder-holding means to position the binders across said path.

52. In a machine of the class described, the combination of means for feeding articles, to be wrapped, through the machine, means for feeding a continuous strip of wrapping material, means for severing wrappers from the strip, means for transferring the wrappers to a position to be applied to the articles, means for folding the wrappers on the articles, means for feeding a continuous piece of binding material to a position to be applied to the articles, means for severing binders from said piece and passing the same around the articles, and means for securing the ends of the binders together.

53. In a machine of the class described, the combination of means for feeding articles to be wrapped, through the machine, means for feeding a continuous strip of wrapping material, means for severing wrappers from the strip, means for transferring the wrappers to a position to be applied to the articles, means for folding the wrappers on the articles, means for feeding a continuous piece of binding material to a position to be applied to the articles, means for severing binders from said piece and passing the same around the articles, and means for tying the ends of the binders together.

54. In a machine of the class described, the combination of means for feeding articles, to be wrapped, through the machine, means for feeding a continuous strip of wrapping material, means for severing wrappers from the strip, means for transferring the wrappers to a position to be applied to the articles, means for folding the wrappers on the articles, means for feeding a plurality of continuous pieces of binding material to a position to be applied to the articles, means for severing a plurality of binders for each article and for passing the same around the articles, and means for tying the ends of all of the binders together.

55. In a machine of the class described, the combination of means for feeding articles, to be wrapped, through the machine, means for feeding a continuous strip of wrapping material, means for severing wrappers from the strip, means for transferring the wrappers to a position to be applied to the articles, means for folding the wrappers on the articles, means for feeding two continuous pieces of binding material to a position to be applied to the articles, means for severing a binder from each strip for each article, and for passing the same around the articles at right angles to each other, and means for grouping and tying the ends of the binders together.

56. In a machine of the class described, the combination of means for moving the articles along a substantially straight path, folding mechanism arranged along said path, and lateral guides, yieldable throughout their length, arranged longitudinally of said path on a plurality of sides thereof.

57. In a machine of the class described, the combination of means for moving the articles along a substantially straight path, folding mechanism arranged along said path, and lateral guides arranged longitudinally of said path and yieldable throughout their length and comprising independently yieldable sections.

58. In a machine of the class described, the combination of means for moving the articles along a substantially straight path, folding mechanism arranged along said path, and lateral guides arranged longitudinally of said path and yieldable throughout their length and comprising independently yieldable sections, on a plurality of sides thereof.

59. In a machine of the class described, the combination of means for moving the articles along a substantially straight path, folding mechanism arranged along said path, and lateral guides arranged longitudinally of said path and yieldable throughout their length and comprising independently movable sections hinged together.

60. In a machine of the class described, the combination of means for moving the articles along a substantially straight path, folding mechanism arranged along said path, and lateral guides arranged longitudinally of said patch on a plurality of sides thereof and yieldable throughout their length and comprising independently movable sections hinged together.

61. In a machine of the class described, the combination of means for moving the articles along a substantially straight path, means for holding a wrapper across said path to be engaged by the articles moving therealong, independent pivotally mounted plates on opposite sides of said path and arranged to normally project transversely of the path for drawing the wrapper around three faces of the article, said plates being bodily yieldable laterally of said path in addition to being movable on their pivots, and additional means for folding the wrapper against the remaining faces of the article.

62. In a machine of the class described, the combination of article feeding mechanism, a reciprocating member arranged to receive the articles from the feeding mechanism, means for feeding a wrapper to a position in the path of said member, means for drawing the wrapper around the front sides of the article as the latter is moved by said member, means adapted to fold the wrapper against the rear face of the article, means adapted to move a portion of said folding means with the article thereon longitudinally of said path, means adapted to receive the article from said folding means and fold the portion of the wrapper along the rear of the article around the ends thereof, means for folding the portions of the wrapper along the sides of the article around the ends thereof, means for moving the article from said last-mentioned folding means, and means adapted to engage the wrapper and draw the portion along the front of the article over the ends thereof.

63. In a machine of the class described, the combination of article feeding mechanism, a reciprocating member arranged to receive the articles from the feeding mechanism, means for feeding a wrapper to a position in the path of said member, means for drawing the wrapper around the front and sides of the article as the latter is moved by said member, means adapted to fold the wrapper against the rear face of the article, means adapted to move a portion of said folding means with the article thereon, longitudinally of said path, means adapted to receive the article from said folding means and fold the portion of the wrapper along the rear of the article around the ends thereof, means for folding the portions of the wrapper along the sides of the article around the ends thereof, means for moving the article from said last-mentioned folding means, means adapted to engage the wrapper and draw the portion along the front of the article over the ends thereof, and means for creasing the sides and ends of the article after the wrapper has been folded therearound.

64. In a wrapping machine, an article supporting and moving platen, a plurality of cam actuated reciprocating rods having an operative connection with said platen, and a folding and article supporting and moving mechanism supported by said rods.

65. In a wrapping machine, an article supporting platen, an arm pivotally supported adjacent said platen and adapted to be moved by an article on the platen, means for moving said platen, and means actuated by said arm to bring said first-mentioned means into operation.

66. In a wrapping machine, an article supporting platen, elevating and folding mechanism, a pivotally supported member arranged adjacent said platen and adapted to contact with the articles deposited on said platen, a link connected to said pivotally supported member, a crank connected to said link, and a latch member arranged on said crank, said latch member normally holding said elevating and folding mechanism inoperative.

67. In a wrapping machine, feeding mechanism, elevating mechanism adapted to receive the article to be wrapped from said feeding mechanism, folding mechanism, a drive shaft, a gear loosely mounted on said drive shaft and adapted to actuate said folding and elevating mechanisms, and means actuated by the article to be wrapped for locking said gear to said shaft.

68. In a wrapping machine, means for imparting a vertical movement to the article to be wrapped, and a plurality of sets of cam actuated interdigitating fingers independently movable transversely to the line of travel of the article to fold the wrapper thereon.

69. In a wrapping machine, means for advancing the article to be wrapped vertically, and a plurality of sets of pivotally supported interdigitating members independently movable transversely to the line of travel of said articles to fold the wrapper thereon.

70. In a wrapping machine, means for imparting a vertical movement to the article to be wrapped, and a plurality of spring pressed pivotally supported wipers normally arranged in the path of travel of the article, said wipers being bodily movable transverse to the line of travel of said article by the article itself.

71. In a wrapping machine, the combination of means for moving the article to be wrapped, a plurality of spring pressed pivotally supported wipers normally arranged in the path of travel of the article, said wipers having a movement transverse to the line of travel of said article, and a plurality of pivotally supported arms supporting said wipers.

72. In a wrapping machine, means for elevating the article to be wrapped, and a plurality of pivotally supported folding members adapted to be moved transversely to the line of travel of said article by the article itself.

73. In a wrapping machine, means for elevating the article to be wrapped, and a cam actuated pivotally supported folding member movable transversely to and longitudinally of the line of travel of said article.

74. In a wrapping machine, means for elevating the article to be wrapped in a substantially straight path, and a folding mechanism moving transversely to the line of travel of the article, said folding mechanism continuing the elevation of said article along said path.

75. In a wrapping machine, means for elevating the article to be wrapped in a substantially straight path, and a plurality of fold forming devices arranged in the path of travel of the article, one of said devices acting to continue the elevation of said article along said path.

76. In a wrapping machine, means for elevating the article to be wrapped, folding means arranged along the path of travel of the article, said folding means continuing the elevation of the article in a substantially straight path, and a second folding means along said path above the folding and elevating means.

77. In a wrapping machine, means for elevating the article to be wrapped, a plurality of rotating folding devices arranged along the path of travel of the article, a shaft supporting each of said devices, means for intermittently imparting a complete rotation to said shafts, and means for moving said devices, after the completion of the rotation, to complete the folds made thereby.

78. In a wrapping machine, means for elevating the article to be wrapped, a plurality of fold forming devices arranged along the path of travel of the article, said devices consisting of a frame, a fold-forming platen mounted for movement on said frame, a plate rigidly supported by said platen, said plate supporting the article to be wrapped while said platen is performing its folding function.

79. In a wrapping machine, means for elevating the article to be wrapped, a fold-forming mechanism arranged along the path of travel of the article, said mechanism continuing the elevation of said article, a second fold-forming mechanism, and an elevating member having an operative connection with the first elevating mechanism.

80. In a wrapping machine, guides forming a substantially straight path, fold-forming mechanism arranged along said path including a reciprocating member arranged to move in said path in one direction and at one side of said path in the opposite direction, and means for moving said member into and out of said path.

81. In mechanism of the class described, the combination of means for applying a wrapper to an article, means whereby a binder is passed around the article to secure the wrapper thereon, and means for securing the ends of the binder, the parts being constructed, arranged and adjustable to handle articles of different sizes.

82. In mechanism of the class described, the combination of means for applying a wrapper to an article, means whereby a binder is passed around the article to secure the wrapper thereon, and means for tying the ends of the binder in a knot, the parts being constructed, arranged and adjustable to handle articles of different sizes.

83. In mechanism of the class described, the combination of means for applying a wrapper to an article, means whereby a plurality of binders are passed around the article to secure the wrapper thereon, and means for securing the ends of the binders together, the parts being constructed, arranged and adjustable to handle articles of different sizes.

84. In mechanism of the class described, the combination of means for applying a wrapper to an article, means whereby a plurality of binders are passed around the article to secure the wrapper thereon, and means for tying the ends of the binders together, the parts being constructed, arranged and adjustable to handle articles of different sizes.

85. In mechanism of the class described, the combination of means for applying a wrapper to an article, means whereby a plurality of binders are passed around the article in different planes to secure the wrapper thereon, and means for grouping and securing all of the ends of the binders together, the parts being constructed. arranged and adjustable to handle articles of different sizes.

86. In mechanism of the class described, the combination of means for applying a wrapper to an article, means whereby a plurality of binders are passed around the article to secure the wrapper thereon, and means for grouping and tying all of the ends of the binders together, the parts being constructed, arranged and adjustable to handle articles of different sizes.

87. In mechanism of the class described, the combination of means for applying a wrapper to an article, means whereby two binders are passed around the article in right-angularly disposed planes, and means for grouping and securing the ends of the binders together, the parts being constructed, arranged and adjustable to handle articles of different sizes.

88. In mechanism of the class described, the combination of means for applying a wrapper to an article, means whereby two binders are passed around the article in right-angularly disposed planes, and means for grouping and tying all of the ends of the binders together, the parts being constructed, arranged and adjustable to handle articles of different sizes.

89. In mechanism of the class described, the combination of means for applying a wrapper to an article, means whereby two binders are passed around the article in right-angularly disposed planes, and means for grouping and tying the ends of the binders in a single knot contiguous to one of the faces of the article, the parts being constructed, arranged and adjustable to handle articles of different sizes.

90. In a machine of the class described, the combination of means for feeding an article into the machine, means adapted to feed wrappers of different sizes to a position to be applied to the article, means for folding the wrapper on the article and adapted to be adjusted laterally of the path of the article to accommodate articles of different sizes, and means adapted to pass a binder around articles of different sizes to secure the wrappers thereon.

91. In a machine of the class described, the combination of means for feeding an article into the machine, means for feeding wrappers of different sizes to a position to be applied to the article, means adjustable laterally of the path of the article for folding wrappers on articles of different sizes, means adapted to pass a cord around articles of different sizes to secure the wrappers thereon, and means for tying the ends of the cord together on one face of articles of different sizes.

92. In a machine of the class described, the combination of means for feeding an article into the machine, means for feeding wrappers of different sizes to a position to be applied to the article, means adjustable laterally of the path of the article for folding wrappers on articles of different sizes, means for passing a cord around articles of different sizes to secure the wrapper thereon, means adapted to hold the wrappers while the cord is being arranged thereon, and means for tying the ends of the cord on articles of different sizes.

93. In a machine of the class described, the combination of means for feeding an article into the machine, means for feeding wrappers of different sizes to a position to be applied to the article, means adjustable laterally of the path of the articles for folding wrappers on articles of different sizes, means adapted to pass two binders around articles of different sizes and in right angularly disposed planes, and means for grouping and securing all of the ends of the binders together on articles of different sizes.

94. In a machine of the class described, the combination of means for feeding an article into the machine, means for feeding wrappers of different sizes to a position to be applied to the article, means adjustable laterally of the path of the articles for folding wrappers on articles of different sizes, means for passing two binders around articles of different sizes in right angularly disposed planes, and means for grouping the ends of all the binders together and for tying the ends in a single knot contiguous to one of the faces of articles of different sizes.

95. In a machine of the class described, the combination of means for feeding an article into the machine, means for feeding wrappers of different sizes to a position to be applied to the article, means adjustable laterally of the path of the articles for folding wrappers on articles of different sizes, means for passing two binders around articles of different sizes in right angularly disposed planes, means for grouping the ends of the binders together at the center of one face of articles of different sizes, and means for tying the ends in a single knot.

96. In a machine of the class described, the combination of means for feeding an article into the machine, means for feeding wrappers of different sizes to a position to be applied to the article, means for moving the article against the wrapper, means for folding wrappers against certain faces of the articles while the articles are in motion, means for intermittently stopping and moving the articles, means for making additional folds in the wrappers while the articles are stationary, means for adjusting said folding means laterally of the path of the articles to accommodate articles of different sizes, means for passing a cord around articles of different sizes, and means for tying the ends of the cord.

97. In a machine of the class described, the combination of guides forming a path for the article and relatively adjustable laterally of said path to accommodate articles of different sizes, means for moving the article along said path, means for placing wrappers of different sizes in the path of the article, means arranged along said path for folding wrappers on the articles and adjustable with said guides, means for holding a binder across said path, means for bringing the ends of the binder together in the rear of articles of different sizes, and means for securing said ends together.

98. In a machine of the class described, the combination of guides forming a rectilinear path for the article and adjustable laterally of said path to accommodate articles of different sizes, means for moving the article along said path, means for placing wrappers of different sizes in the path of the article, folding means for the wrapper arranged along said path, means for holding a binder in the path of the article, means adapted to bring the ends of the binder together in the rear of articles of different sizes, and means for tying said ends together contiguous to the rear face of the article.

99. In a machine of the class described, the combination of guides forming a rectilinear path for the article and adjustable laterally of said path to accommodate articles of different sizes, means for moving the articles along said path, means for placing wrappers in the path of the article, folding means for the wrapper arranged along said path, means for holding a plurality of binders in different planes across the path of the article, means adapted to bring the ends of the binders together in the rear of articles of different sizes, and means for tying said ends contiguous to the rear face of the article.

100. In a machine of the class described, the combination of guides forming a rectilinear path for the article and adjustable laterally of said path to accommodate articles of different sizes, means for moving the article along said path, means adapted to place wrappers of different sizes in the path of the article, folding means for the wrapper arranged along said path, means for holding two right angularly arranged binders in the path of the article, means adapted to bring the end of the binders together in the rear of articles of different sizes, and means for tying all of said ends in a single knot.

101. In a machine of the class described, the combination of guides forming a rectilinear path for the article and adjustable laterally of said path to accommodate articles of different sizes, means for severing wrappers from a continuous strip and placing the same in the path of the article, said means being adapted to be adjusted to vary the length of the wrapper, folding means, adjustable with said guides, arranged along said path and adapted to fold wrappers against certain faces of articles while the articles are in motion, means adapted to make the remaining folds in the wrapper while the articles are stationary, means adapted to pass a binder around a plurality of faces of articles of different sizes while the articles are in motion, and means adapted to bring the ends of the binder together in the rear of the articles while stationary.

102. In a machine of the class described, the combination of guides forming a path for the articles and adjustable laterally of said path to accommodate articles of different sizes, means adapted to sever wrappers from a continuous strip and place the same in the path of the article and adjustable to vary the length of the wrappers, means adjustable with said guides and adapted to fold wrappers against certain faces of articles while the articles are in motion, means for making the remaining folds in the wrapper while the articles are stationary, means adapted to pass two right angularly arranged binders around certain faces of articles of different sizes while the articles are in motion, means adapted to bring the ends of the binders together in the rear of the articles, and means for tying all of the ends in a single knot.

103. In a machine of the class described, the combination of a continuously operating article feeding mechanism, wrapper feeding mechanism, folding mechanism, binding and tying mechanism, means adapted to be actuated by an article entering the machine for automatically setting said mechanisms into operation, and means for adjusting said folding mechanism laterally of the path of the article to accommodate articles of different sizes.

104. The combination of means for applying a wrapper to an article, means for creasing certain faces of the article, means for passing a plurality of binders around the article and in said creases, means for grouping and securing all of said binders together, and means for adjusting said creasing means laterally of the path of the article to accommodate articles of different sizes.

105. The combination of means for applying a wrapper to an article, means for creasing certain faces of the article, means for placing a binder around the article in said creases, means for tying the ends of the binder together, and means for adjusting said creasing means laterally of the path of the article to accommodate articles of different sizes.

106. The combination of guides forming a path for the article and adjustable laterally of said path to accommodate articles of different sizes, means carried by certain of said guides for creasing faces of the articles, means for passing a binder around the article and in said creases, and means for grouping and tying the ends of the binder together.

In testimony whereof I affix my signature in presence of two witnesses.

ARTHUR J. COON.

Witnesses:
FRANCIS CANNON,
EDWARD D. ANTHONY.

Correction in Letters Patent No. 1,132,165.

It is hereby certified that in Letters Patent No. 1,132,165, granted March 16, 1915, upon the application of Arthur J. Coon, of Providence, Rhode Island, for an improvement in "Machines for Automatically Wrapping, Binding, and Tying Packages," an error appears in the printed specification requiring correction as follows: Page 18, strike out line 107, and insert the syllable and words *ing certain faces of the article, means for;* and that the said Letters Patent should be read with this correction therein that the same may conform to the record of the case in the Patent Office.

Signed and sealed this 11th day of May, A. D., 1915.

[SEAL.]

R. F. WHITEHEAD,
*Acting Commissioner of Patents.*